(12) United States Patent
Takahata et al.

(10) Patent No.: US 9,300,985 B2
(45) Date of Patent: Mar. 29, 2016

(54) INFORMATION DISTRIBUTION DEVICE, INFORMATION DISTRIBUTION METHOD, AND INFORMATION DISTRIBUTION PROGRAM

(71) Applicants: KABUSHIKI KAISHA TOSHIBA, Tokyo (JP); TOSHIBA TEC KABUSHIKI KAISHA, Tokyo (JP)

(72) Inventors: Masami Takahata, Tokyo (JP); Mika Hirama, Tokyo (JP); Naoki Watanabe, Tokyo (JP); Tomonori Ikumi, Shizuoka (JP); Yumiko Okuma, Tokyo (JP); Mahina Nakamura, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 90 days.

(21) Appl. No.: 14/182,124

(22) Filed: Feb. 17, 2014

(65) Prior Publication Data

US 2014/0235160 A1 Aug. 21, 2014

(30) Foreign Application Priority Data

Feb. 18, 2013 (JP) ................................. 2013-028964

(51) Int. Cl.
| | |
|---|---|
| H04H 20/61 | (2008.01) |
| H04N 21/222 | (2011.01) |
| H04W 4/18 | (2009.01) |
| H04W 4/00 | (2009.01) |
| H04N 21/414 | (2011.01) |
| H04N 21/63 | (2011.01) |
| H04N 21/8355 | (2011.01) |

(52) U.S. Cl.
CPC ..... *H04N 21/2223* (2013.01); *H04N 21/41407* (2013.01); *H04N 21/631* (2013.01); *H04N 21/8355* (2013.01); *H04W 4/008* (2013.01); *H04W 4/18* (2013.01)

(58) Field of Classification Search
CPC ........ H04H 20/61; H04H 20/71; H04W 4/18; H04N 21/2223
USPC ............ 455/3.01, 414.2, 452.1, 456.3, 456.2, 455/41.2, 509
See application file for complete search history.

(56) References Cited

U.S. PATENT DOCUMENTS

| | | | | |
|---|---|---|---|---|
| 8,331,861 | B2 * | 12/2012 | Flinchem | 455/41.2 |
| 8,639,625 | B1 * | 1/2014 | Ginter et al. | 705/51 |
| 2002/0065732 | A1 * | 5/2002 | Rodgers et al. | 705/26 |

(Continued)

FOREIGN PATENT DOCUMENTS

| | | |
|---|---|---|
| JP | 2004-086441 | 3/2004 |
| JP | 2010-205185 A | 9/2010 |
| JP | 2012-155411 | 8/2012 |

OTHER PUBLICATIONS

Office Action mailed Jan. 6, 2015, filed in corresponding Japanese Patent Application No. 2013-028964, with English translation.

* cited by examiner

*Primary Examiner* — John J Lee
(74) *Attorney, Agent, or Firm* — Patterson & Sheridan, LLP

(57) ABSTRACT

An information distribution device includes a display unit, a reception unit, and a distribution unit. The display unit displays information of distributable full content. The reception unit receives a trial request for the distributable full content from the portable terminal. The distribution unit distributes, as trial content which is viewable within a limited physical range, the distributable full content for which the trial request is received, to the portable terminal.

20 Claims, 16 Drawing Sheets

| CATEGORY ID | CATEGORY NAME |
|---|---|
| C001 | MOVIE |
| C002 | BOOK |
| C003 | NEWSPAPER |
| C004 | MUSIC |
| C005 | GAME |
| C006 | APPLICATION |

FIG. 7

| GENRE ID | GENRE NAME |
|---|---|
| G001 | ACTION |
| G002 | SUSPENSE |
| G003 | SF |
| G004 | DRAMA |
| G005 | ROMANCE |
| G006 | LITERATURE |
| G007 | MISTERY |
| G008 | DRAMA |
| G009 | PICTURE BOOK |
| G010 | ANIMATION |

FIG. 8

| CONTENT ID | CATEGORY ID | GENRE ID | CONTENT NAME | EXPLANATION DIRECTOR OR CAST | EVALUATION | URL FOR ACCESS | CONTENT PATH |
|---|---|---|---|---|---|---|---|
| I001 | C001 | G001 | HOGE HOGE | | 3 | http://··· | C:¥···¥···¥··· |
| I002 | C001 | G001 | | | | | |
| I003 | C001 | G002 | | | | | |
| I004 | C001 | G002 | | | | | |
| I005 | C001 | G003 | | | | | |
| I006 | C001 | G004 | | | | | |
| I007 | C002 | G007 | | | | | |
| I008 | C002 | G007 | | | | | |
| I009 | C002 | G010 | | | | | |
| I010 | C002 | G010 | | | | | |
| ··· | | | | | | | |

| CONTENT ID | TRIAL DATE AND TIME | NUMBER OF TIMES OF TRIAL | NUMBER OF TIMES OF DOWNLOADING |
|---|---|---|---|
| I001 | 2012/12/19 15:00:00 | 15 | 3 |
| I002 | 2012/12/19 13:31:13 | 9 | 7 |
| I003 | 2012/12/19 14:44:45 | 39 | 13 |
| I004 | | | |
| I005 | | | |
| I006 | | | |
| I007 | | | |
| I008 | | | |
| I009 | | | |
| I010 | | | |
| .... | | | |

31d

INFORMATION DISTRIBUTION DEVICE, INFORMATION DISTRIBUTION METHOD, AND INFORMATION DISTRIBUTION PROGRAM

CROSS-REFERENCE TO RELATED APPLICATION

This application is based upon and claims the benefit of priority from Japanese Patent Application No. 2013-028964, filed Feb. 18, 2013, the entire contents of which are incorporated herein by reference.

FIELD

Embodiments described herein relate generally to an information distribution device, an information distribution method, and an information distribution program.

BACKGROUND

Heretofore, information distribution devices providing information, including content such as written audio or video content, to users included a kiosk terminal. Kiosk terminals used as information distribution devices include a terminal having a function of distributing various types of digital content to a user's portable terminal in response to an operation of the user.

However, digital content has a large size and a large distribution load on a network and kiosk architecture.

DESCRIPTION OF THE DRAWINGS

FIG. 7 is a diagram illustrating a configuration example of a genre table in the kiosk terminal according to this embodiment.

FIG. 8 is a diagram illustrating a configuration example of a content management table in the kiosk terminal according to this embodiment.

FIG. 9 is a diagram illustrating a configuration example of a history table in the kiosk terminal according to this embodiment.

DETAILED DESCRIPTION

Embodiments provide an information distribution device, an information distribution method, and an information distribution program which are capable of efficiently enabling the selecting of a content by a user and distributing or disbursing the selected content to a user.

In general, according to one embodiment, an information distribution device includes a display unit, a reception unit, and a distribution unit. The display unit displays information of distributable full content. The reception unit receives a trial request for the distributable full content from the portable terminal. The distribution unit distributes, as a trial content which is viewable within a limited physical range, the distributable full content for which the trial request is received, to the portable terminal.

Hereinafter, an embodiment will be described with reference to the accompanying drawings.

First, a configuration of an information distribution system including a kiosk terminal as an information distribution device according to this embodiment will be described.

Figure 1:
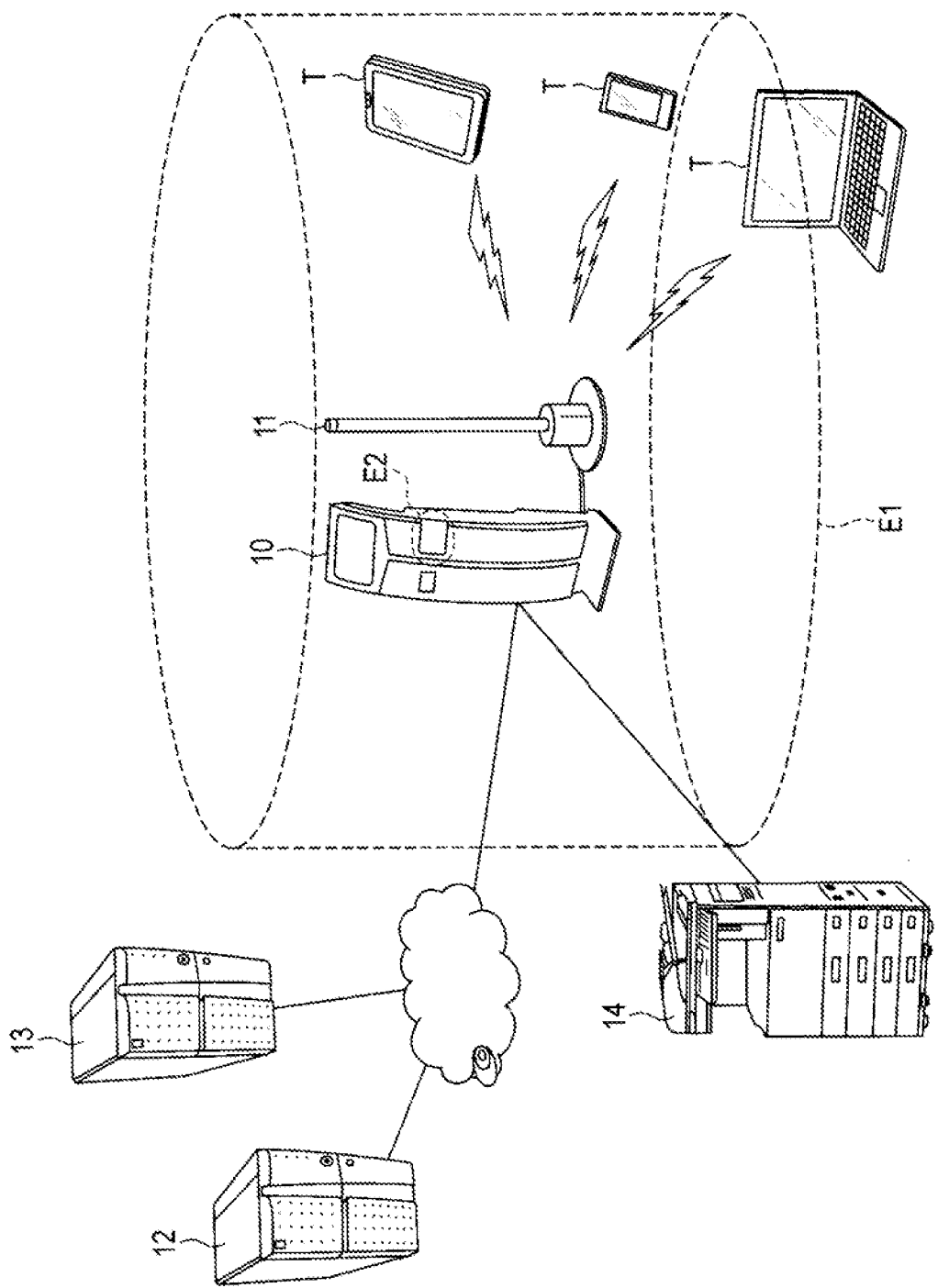
FIG. 1 is a diagram illustrating a configuration example of an information distribution system according to this embodiment.
Figure 2:
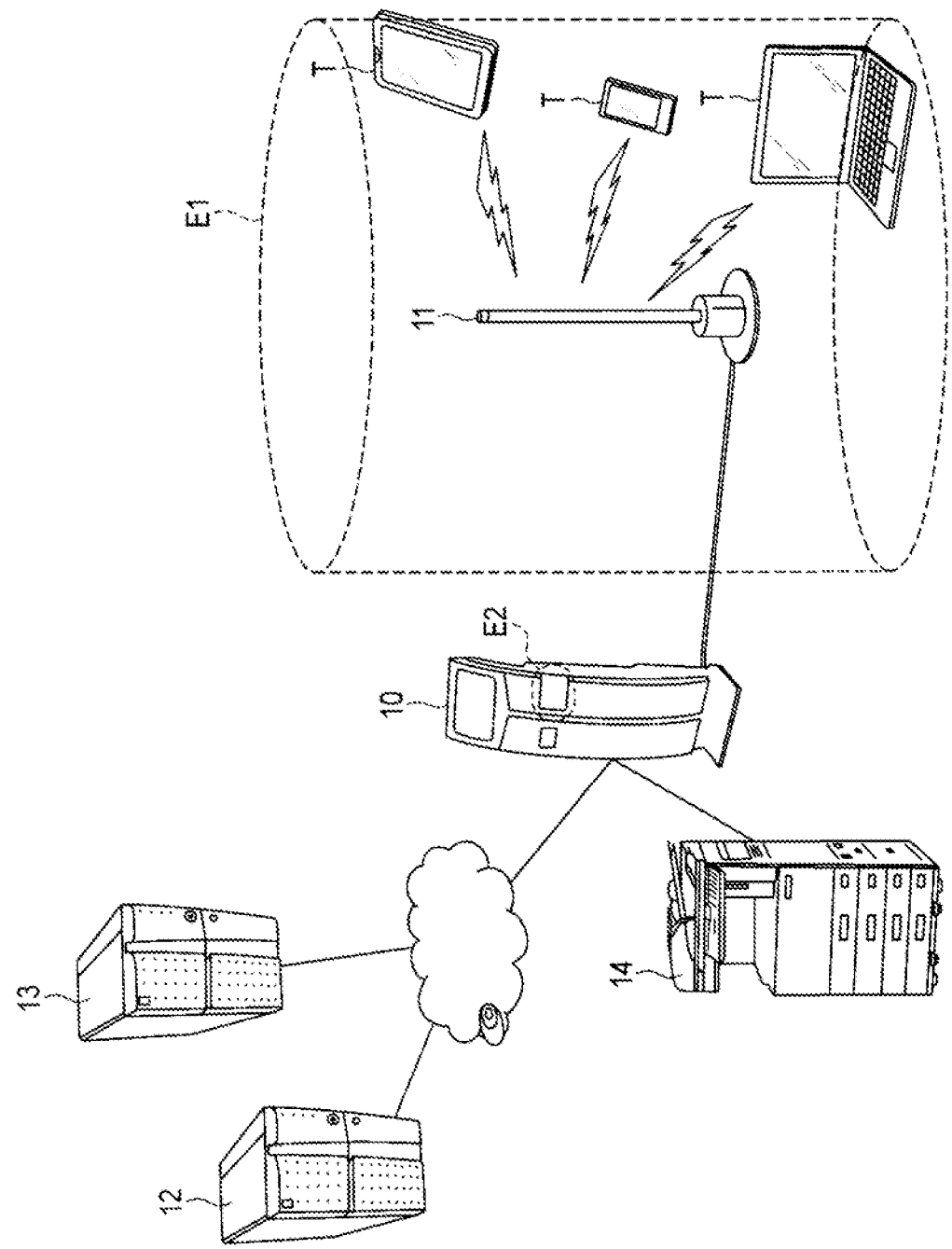
FIG. 2 is a diagram illustrating a configuration example of the information distribution system according to this embodiment.

FIG. 1 and FIG. 2 are schematic diagrams illustrating a configuration example of the information distribution system according to this embodiment.

An information distribution system 1 includes a kiosk terminal 10, a wireless device 11, a content server 12, a recommendation server 13, a digital multi-function peripheral (MFP) 14, and the like. The information distribution system 1 is a system in which the kiosk terminal 10 is used to distribute content to a portable terminal T of a user.

The kiosk terminal 10 is connected with the wireless device 11, the content server 12, the recommendation server 13, and the digital multi-function peripheral (MFP) 14. The kiosk terminal 10 is a device which is operated by a user. The kiosk terminal 10 distributes content to the portable terminal T which is carried by a user. The kiosk terminal 10 is installed in a place where a plurality of users is assumed to be present or is assumed to pass by. The kiosk terminal 10 is installed, for example, in a supermarket, a bookstore, a CD shop, a rental shop, a movie theater, a live show venue, a station, or an airport.

The kiosk terminal 10 has two communication functions for communicating with the portable terminal T. The two communication functions are different communication methods.

The first communication function is a function of communicating with the portable terminal T within a predetermined communication range E1, i.e., within a predetermined physical distance from the wireless device 11. The first communication function of the kiosk terminal 10 distributes trial content that may be reproduced in the portable terminal T when the portable terminal T is within the communication range E1. For example, the first communication function is a function of communicating with the portable terminal T by wireless communication such as with a wireless LAN through the wireless device 11. The first communication function is limited to a communication range in which the wireless device 11 may transmit and receive radio waves.

In addition, the second communication function is a function of communicating with the portable terminal T which is in close proximity to a predetermined position within the kiosk terminal 10. The kiosk terminal 10 downloads content to the portable terminal T using the second communication function. For example, the second communication function is a function of communicating with the portable terminal T in a communication range (proximate state) which is smaller than that of the first communication function, by non-contact communication (proximity wireless communication, near field wireless communication) or the like. In addition, for the second communication function, a communication method, for example, TransferJet®, NFC, or a USB is used.

The wireless device 11 is a device by which the kiosk terminal 10 transmits and receives radio waves for performing wireless communication with the portable terminal T by the first communication function. The kiosk terminal 10 distributes trial content to the portable terminal T by wireless communication through the wireless device 11. The wireless device 11 may transmit and receive radio waves in a predetermined communication range (reception range) E1. The portable terminal T may reproduce (browse) the trial content within the communication range E1 of the wireless device 11 as illustrated in FIG. 1 or FIG. 2. The kiosk terminal 10 and the wireless device 11 are connected with each other through a communication line such as a LAN. Meanwhile, the wireless device 11 may be built into the kiosk terminal 10.

The kiosk terminal 10 performs wireless communication in the predetermined communication range E1 by transmitting and receiving radio waves using the wireless device 11. The wireless device 11 may be a device capable of setting a communication range by a communication method allowing wireless communication with the portable terminal T to be performed. In addition, the wireless device 11 performs wireless communication with the portable terminal T of a user operating the kiosk terminal 10. The wireless device 11 is installed so that the area (distance from the wireless device 11) in which the trial content may be reproduced on a user terminal T is set to be in the communication range E1. FIG. 1 illustrates a configuration example in which the kiosk terminal 10 is set to be in the communication range E1 of the wireless device 11. FIG. 2 is a configuration example in which the kiosk terminal 10 is beyond the communication range E1 of the wireless device 11.

For example, for the wireless device 11, a device using a leaky coaxial cable (LCX) is assumed. The LCX is a coaxial cable, such as a wireless LAN, which is provided with a slot which radiates radio waves for communication. In the LCX, a communication range is easily set, and the installation thereof is also easily performed. In addition, a device referred to as an LCX tower serving as an access point using the LCX may be used as the wireless device 11.

The content server 12 is a server that manages digital content. The content server 12 is connected with the kiosk terminal 10 through a network such as the Internet or a LAN. The kiosk terminal 10 acquires the digital content to be provided to a user from the content server 12. The kiosk terminal 10 may be configured such that a content acquired from the content server 12 is accumulated in a database (DB) in advance. The kiosk terminal 10 may acquire specific content from the content server 12 in response to a demand for downloading (purchase) from a user.

The recommendation server 13 is a server that executes recommendations. For example, the recommendation server 13 has a function (recommendation engine) of determining content to be recommended to a user, on the basis of information (downloading history and trial history of content by that user or by users generally) on a usage history for each type of content. The recommendation engine is a function which is performed by a processor of the server 13 executing a program for recommendation. The recommendation server 13 is connected with the kiosk terminal 10 through a network such as the Internet or a LAN. The recommendation server 13 transmits information, indicating the content to be recommended to a user which is determined by the recommendation engine, to the kiosk terminal 10. Meanwhile, the recommendation engine may be configured to be included in the kiosk terminal 10.

The digital multi-function peripheral (MFP) 14 is a multi-function machine having functions such as printing, scanning, image processing, and/or a FAX (facsimile transmission capability). The digital multi-function peripheral 14 is connected with the kiosk terminal 10 through a communication line such as a LAN. In addition, the kiosk terminal 10 may be connected with other devices such as a bar code printer (BCP).

The portable terminal T is a terminal which may be carried by a user. The portable terminal T is a device, for example, a mobile phone, a smart phone, a tablet PC, an electronic book reader, or a notebook PC. In this embodiment, the portable terminal T has two communication functions corresponding to the first communication function and the second communication function of the kiosk terminal 10. For example, the portable terminal T communicates with the kiosk terminal 10 by radio waves transmitted and received by the wireless device 11 in the communication range E1. In addition, the portable terminal T communicates with the kiosk terminal 10 by proximity wireless communication (non-contact communication) in a state where the portable terminal is in close proximity to a predetermined position in the kiosk terminal 10.

Next, a configuration of the kiosk terminal 10 according to this embodiment will be described.

Figure 3:
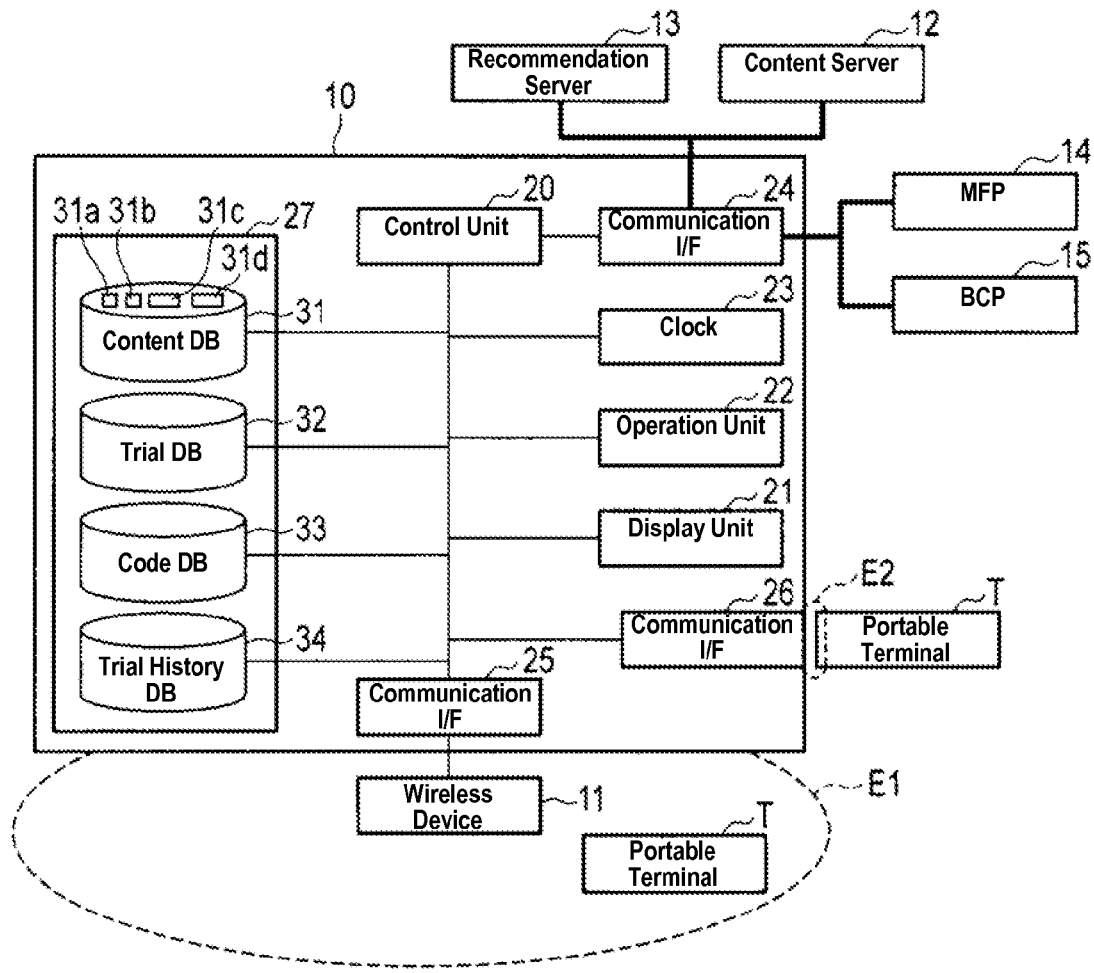
FIG. 3 is a block diagram illustrating a configuration example of a kiosk terminal according to this embodiment.

FIG. 3 is a block diagram illustrating a configuration example of the kiosk terminal 10.

In the configuration example illustrated in FIG. 3, the kiosk terminal 10 includes a control unit 20, a display unit 21, an operation unit 22, a clock 23, a communication I/F (I/F meaning and interface herein) 24, a first communication I/F (reception unit) 25, a second communication I/F (distribution unit) 26, and a storage unit 27.

The control unit 20 performs the control of the entire kiosk terminal 10, including data processing, and the like. The control unit 20 is constituted by, for example, a processor such as a CPU, various types of memories, and various types of internal interfaces. The control unit 20 and performs various processes by the processor executing an application program stored in the memory. For example, the control unit 20 performs control to distribute or disseminate content to the portable terminal T by the processor executing the program. The control unit 20 controls details displayed on the display unit 21 in response to an operation using the operation unit 22, as a result of the processor executing a program.

The display unit 21 and the operation unit 22 function as a user interface (UI). The display unit 21 and the operation unit 22 are constituted, for example, by a display device in which a touch panel is provided. The display unit 21 displays an operation guide, an introduction screen for content to be distributed, and various operation screens having an operation icon and the like. The operation unit 22 is a unit through which a user inputs an operation instruction. For example, the operation unit 22 can select an icon displayed on the display unit 21 touch panel. In addition, the operation unit 22 may be a keyboard, or a pointing device such as a mouse. The operation unit 22 may be a unit for inputting an instruction based on a user's gesture operation, or may be a unit for inputting an instruction based on a sound.

The clock 23 maintains the current date and time. For example, the clock 23 is driven in a state where the clock is backed up by a battery. In addition, the clock 23 may correct a current time in synchronization with an external server, or may correct the current time by standard radio waves indicating a standard time.

The communication I/F 24 is an interface for connection with an external server (for example, the content server 12 or the recommendation server 13) or an external device (for example, the MFP 14 or the BCP 15). The communication I/F 24 may be any interface as long as it is connected with each device, and does not limit a connection configuration. For example, the communication I/F 24 may be a network interface for connection with the Internet or a LAN, or may be an interface for local connection with an external apparatus. In addition, the communication I/F 24 is an interface for connection with a plurality of devices (server and external device), and corresponds to communication in various protocols. In the example illustrated in FIG. 2, the communication I/F 24 functions as an interface connected to the content server 12, the recommendation server 13, the MFP 14, and the BCP 15.

The first communication I/F 25 and the second communication I/F 26 are interfaces for communication with the portable terminal T. The first communication I/F 25 and the second communication I/F 26 communicate with the portable terminal T using different communication methods.

The first communication I/F 25 may be any interface as long as it communicates with the portable terminal T in the first communication range E1. The first communication range is set to be an area where trial content may be reproduced. For example, insofar as trial content may be reproduced in the vicinity of the kiosk terminal 10 including the kiosk terminal 10, the first communication range may be set so that the kiosk terminal 10 is within the communication range as illustrated in FIG. 1. In addition, insofar as the trial content may be reproduced in a place distant from the kiosk terminal 10, the first communication range may be set so that the kiosk terminal 10 is beyond the communication range as illustrated in FIG. 2.

The first communication I/F 25 is constituted by an interface that performs wireless communication in a wireless LAN system in which a communication range using the wireless device 11 is set to the first communication range E1. As the wireless communication using the wireless LAN system, wireless communication using an LCX is assumed. Meanwhile, the LCX is a wireless communication technique in which a transmission and reception range of radio waves is set to be within a predetermined range with a coaxial cable as the center, and thus a communication range is easily set.

In addition, the second communication I/F 26 is an interface using a communication method which is appropriate for content downloading. The second communication I/F 26 may be any interface as long as it communicates with the portable terminal T by using an area close to the kiosk terminal 10 as the communication range (second communication range) E2. The second communication range E2 may be narrower than the first communication range E1, and may be an area close to a predetermined position (installation position of second communication I/F) of the kiosk terminal 10.

In the second communication I/F 26, a communication method is adopted which is capable of transmitting large volumes of data (large bit quantities) to the portable terminal T in a proximate state at a high speed with a simple operation. For example, for the second communication I/F 26, a near field wireless communication (proximity wireless communication, non-contact communication, near field wireless communication) method is used to perform wireless (non-contact) communication in a proximate state, i.e., where the receiving device or portable terminal 10 is proximate to the kiosk terminal 10. In addition, as a proximity wireless communication technique adopted as the second communication I/F, TransferJet (registered trademark), NFC, or the like is assumed. TransferJet (registered trademark) and NFC are communication methods that allow data transmission without a user's operation when the portable terminal T is brought close to an communication interface. For example, when the TransferJet (registered trademark) approach is adopted as the second communication I/F 26 methodology, the kiosk terminal 10 may transmit data including content to the portable terminal T simply by a user's moving of the portable terminal T into the communication range E2.

Thus, in the first communication I/F 25 and the second communication I/F 26, a communication method according to an operation form, a type of a content to be distributed, or a communication function of the portable terminal T is adopted. In addition, the first communication I/F 25 and the second communication I/F 26 are not limited to wireless communication. For example, the second communication I/F 26 may be an interface that directly connects the portable terminal T to a physical connector provided in the kiosk terminal 10 using a communication cable or the like.

The storage unit 27 stores various pieces of data. The storage unit 27 is constituted by a rewritable nonvolatile memory which is large in capacity such as an HDD or an SSD. In addition, the storage unit 27 includes databases (hereinafter DB such as a content DB 31, a trial DB 32, a code DB 33, or a trial history DB 34.

The content DB 31 saves a content to be downloaded to the portable terminal T from the kiosk terminal 10. The trial DB 32 stores a trial content and restriction information for restricting the reproduction of the trial content. The code DB 33 saves code information in which information for reproducing the trial content is coded. The code DB 33 stores image information (for example, two-dimensional bar code) which is read in the portable terminal T, as the code information. The history DB 34 saves history information indicating a downloading history of a content, and history information (trial history information) which indicates a history of the reproduction (execution) of the trial content.

Next, a configuration of the portable terminal T according to this embodiment will be described.

Figure 4:
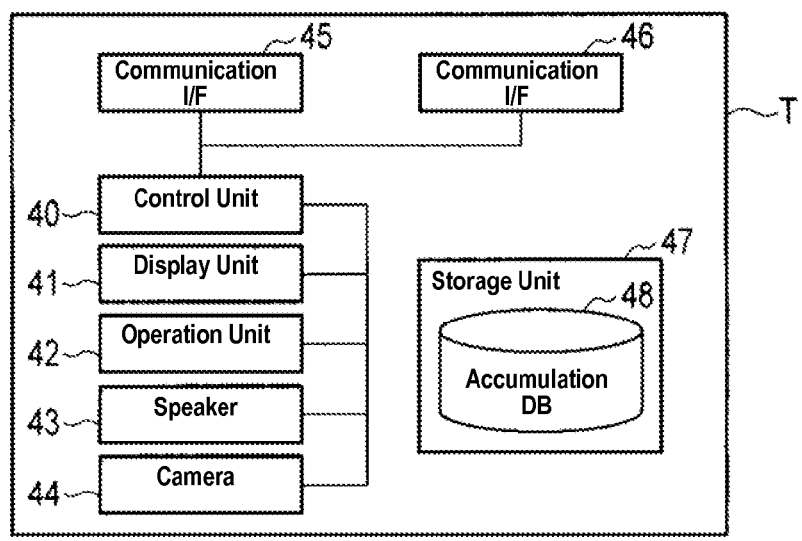
FIG. 4 is a block diagram illustrating a configuration example of a portable terminal according to this embodiment.

FIG. 4 is a diagram illustrating a configuration example of a portable terminal T according to this embodiment.

In the configuration example illustrated in FIG. 4, the portable terminal T includes a control unit 40, a display unit 41, an operation unit 42, a speaker 43, a camera 44, a first communication I/F 45, a second communication I/F 46, and a storage unit 47.

The control unit 40 performs the control of the entire portable terminal T, data processing, and the like. The control unit 40 is constituted by, for example, a processor such as a CPU, various types of memories, and various types of internal interfaces. The control unit 40 performs various processes by the processor executing a program stored in the memory. In addition, the control unit 40 includes a cache memory used to reproduce content. The control unit 40 has a function of restricting a time period for which data is saved in the cache memory or the like.

For example, the control unit 40 receives a content downloaded from the second communication I/F 26 of the kiosk terminal 10 by the processor executing an application program, or saves the received content in the storage unit 47. In addition, the control unit 40 acquires code information for reproducing (executing) one or more trial contents from the kiosk terminal 10 by the processor executing the application program, or reproduces the trial content which is distributed by the first communication I/F 25 of the kiosk terminal 10, on the basis of the acquired code information.

In addition, the control unit 40 has a function of reproducing (executing) a content using the display unit 41 and the speaker 43, by the processor executing the application program. For example, the control unit 40 reproduces a content which is accumulated (downloaded from kiosk terminal) in the accumulation DB 48. In addition, the control unit 40 reproduces a trial content which may be reproduced within the predetermined communication range E1. For example, the control unit 40 restricts the saving of data in the cache memory to thereby restrict the reproduction (execution) of the trial content to the predetermined communication range E1.

The display unit 41, the operation unit 42, and the speaker 43 function as a user interface (UI). The display unit 41 and the operation unit 42 are constituted, for example, by a display device in which a touch panel is built. The display unit 41 displays (reproduces) the content downloaded from the kiosk terminal 10, displays the trial content, or displays an operation icon.

The operation unit 42 is a unit through which a user inputs an operation instruction. For example, the operation unit 42 is a touch panel provided in a display region of the display unit 41. In addition, the operation unit 42 may be constituted by a keyboard, a numeric keypad, or a pointing device such as a mouse. In addition, the operation unit 42 may be a unit for inputting a user's gesture operation, or may be a unit for inputting an instruction based on a sound.

The speaker 43 reproduces a sound. In addition, the speaker 43 may be an interface that outputs a sound signal to a headphone or the like.

The camera 44 captures an image. The camera 44 optically reads an image using a CCD sensor or the like to convert the captured image into image data. For example, the camera 44 captures an image including code information displayed on the display unit 21 of the kiosk terminal 10.

The first communication I/F 45 and the second communication I/F 46 are interfaces for communication with the kiosk terminal 10 by different communication methods. In this embodiment, the first communication I/F 45 is an interface communicating with the first communication I/F 25 of the kiosk terminal 10. For example, when the first communication I/F 25 of the kiosk terminal 10 is an interface that performs wireless communication using a wireless communication method of a wireless LAN, the first communication I/F 45 is constituted by an interface that performs wireless communication using a wireless communication method of a wireless LAN. The second communication I/F 46 is an interface communicating with the second communication I/F 26 of the kiosk terminal 10. For example, in the kiosk terminal 10, when the second communication I/F 26 is an interface that performs wireless communication using a proximity wireless communication method, the second communication I/F 46 is also constituted by an interface that performs wireless communication using the proximity wireless communication method.

The storage unit 47 stores various pieces of data. For example, the storage unit 47 is constituted by a rewritable nonvolatile memory which is large in capacity such as an HDD or an SSD. In addition, the storage unit 47 includes the accumulation DB 48. The accumulation DB 48 saves content acquired (downloaded) from the kiosk terminal 10.

Next, application programs in the kiosk terminal 10 and the portable terminal T according to an embodiment will be described.

Figures 5, 6:
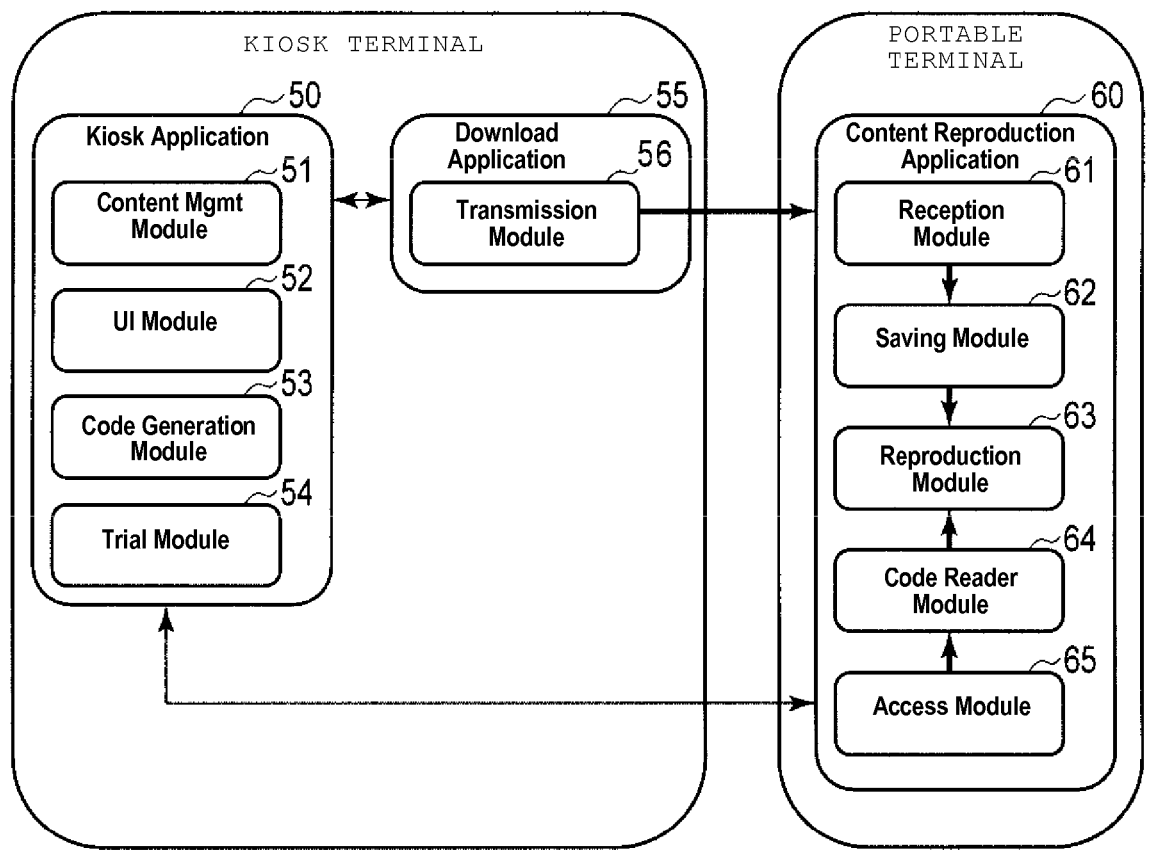
FIG. 5 is a diagram illustrating a configuration example of process modules in the kiosk terminal and the portable terminal according to this embodiment.
FIG. 6 is a diagram illustrating a configuration example of a category table in the kiosk terminal according to this embodiment.

FIG. 5 illustrates a configuration example of application programs installed in the kiosk terminal 10 and the portable terminal T according to this embodiment.

As an application program to be executed by the processor of the control unit 20, a kiosk application 50 and a download application 55 are installed in the kiosk terminal 10. The kiosk application 50 and the download application 55 may be stored in the memory within the control unit 20, or may be stored in the storage unit 27. The kiosk application 50 is a group of programs (modules) for controlling the kiosk terminal 10. The download application 55 is a group of programs (modules) for performing a process of downloading a content. The kiosk application 50 and the download application 55 execute a process in cooperation with each other.

In the configuration example illustrated in FIG. 5, the kiosk application 50 includes a content management module 51, a user interface (UI) module 52, a code generation module 53, and a trial module 54.

The content management module 51 is a program for managing a content. The UI module 52 is a program for controlling user interfaces such as the display unit 21 and the operation unit 22 in the kiosk terminal 10. The code generation module 53 is a program that generates code information for access to a trial content. The trial module 54 is a program for providing the trial content.

The download application 55 includes a transmission module 56. The transmission module 56 is a program for transmitting content by the second communication I/F 26. The transmission module 56 has a function of controlling communication with the portable terminal T using the second communication I/F 26.

In the configuration example illustrated in FIG. 5, a content reproduction application 60 is installed in the portable terminal T, as an application program to be executed by the processor of the control unit 40. The content reproduction application is a group of programs (modules) for reproducing content and trial content provided by the kiosk terminal 10 in the portable terminal T. In the configuration example illustrated in FIG. 5, the content reproduction application 60 includes a reception module 61, a saving module 62, a reproduction module 63, a code reader module 64, and an access module 65.

The reception module 61 is a program for receiving content downloaded using the second communication I/F 46 of the portable terminal T. The reception module 61 has a function of controlling communication with the kiosk terminal 10 using the second communication I/F 46. The saving module 62 is a program for saving content. The reproduction module 63 is a program for reproducing content. The code reader module 64 is a program for reading code information. The code reader module 64 has a function of decoding the read code information. The access module 65 is a program for access to a trial content. The access module 65 has access to the trial content based on information (URL) in which the code information is decoded.

Next, the management of content in the kiosk terminal 10 will be described.

The kiosk terminal 10 has a function of managing content and trial content. The control unit 20 manages the content using a table (category table, genre table) in which information on the classification (category, genre) of the content is stored and a table (content table) in which information on the content is stored. In addition, the control unit 20 manages usage situations and a usage history using a table (history table) for managing information concerning the use of the content.

FIG. 6 illustrates a configuration example of a category table 31a.

The category table 31a stores information on a category of a content. The kiosk terminal 10 classifies different types of content by categories. In the configuration example illustrated in FIG. 6, the category table 31a stores category IDs for identifying the categories in association with category names. When a new category is added to content, or when an existing category is removed, the control unit 20 updates the category table 31a.

FIG. 7 illustrates a configuration example of a genre table 31b.

The genre table 31b stores information on a genre of a content. The kiosk terminal 10 classifies contents not only by categories but also by genres. In the configuration example illustrated in FIG. 7, the genre table 31b stores IDs (genre IDs) for identifying the genres in association with genre names. When a new genre is added to a content to be dealt with or when the existing genre is removed, the control unit 20 updates the genre table 31b.

FIG. 8 illustrates a configuration example of a content table 31c.

The content table 31c stores information for managing content. The content table 31c stores content IDs in association with content names with respect to respective content. In the example illustrated in FIG. 8, the content table 31c stores information on the classification of the content such as categories and a genres, in association with individual content identified by the content IDs or the content names. The content table 31c stores content information such as the description of the content or the evaluation of the content in association with each content. The content table 31c stores information on a trial content such as information (access URL of trial content) for access to the trial content, in association with each content. The content table 31c stores information on a content such as information (path of content data) which indicates a saving destination of the content, in association with each content.

FIG. 9 illustrates a configuration example of a history table 31a.

The history table 31a stores information indicating usage of content. In the example illustrated in FIG. 9, the history table 31a stores the date and time (trial date and time) when trial is viewed by or sent to a user, the total number of times of the trial content was sent to or viewed by a user (number of times of trial), and the number of times the content corresponding to the trial content was downloaded (purchased) by a user (number of times of downloaded).

For example, the control unit 20 analyzes usage situations regarding specific items of content, on the basis of the information stored in the history table 31a. The information stored in the history table 31a may be used for the creation of a ranking of the content by sales volume, trend analysis, recommendation or the like, with respect to the specific item of content. In addition, the control unit 20 is also used to create a list (display list of contents) which is displayed on a trial history screen, on the basis of the information stored in the history table 31a.

Next, an example of an operation screen in the kiosk terminal 10 according to this embodiment will be described.

FIG. 10 to FIG. 14 are examples of the operation screen displayed on the display unit 21 of the kiosk terminal 10.

Figure 10:
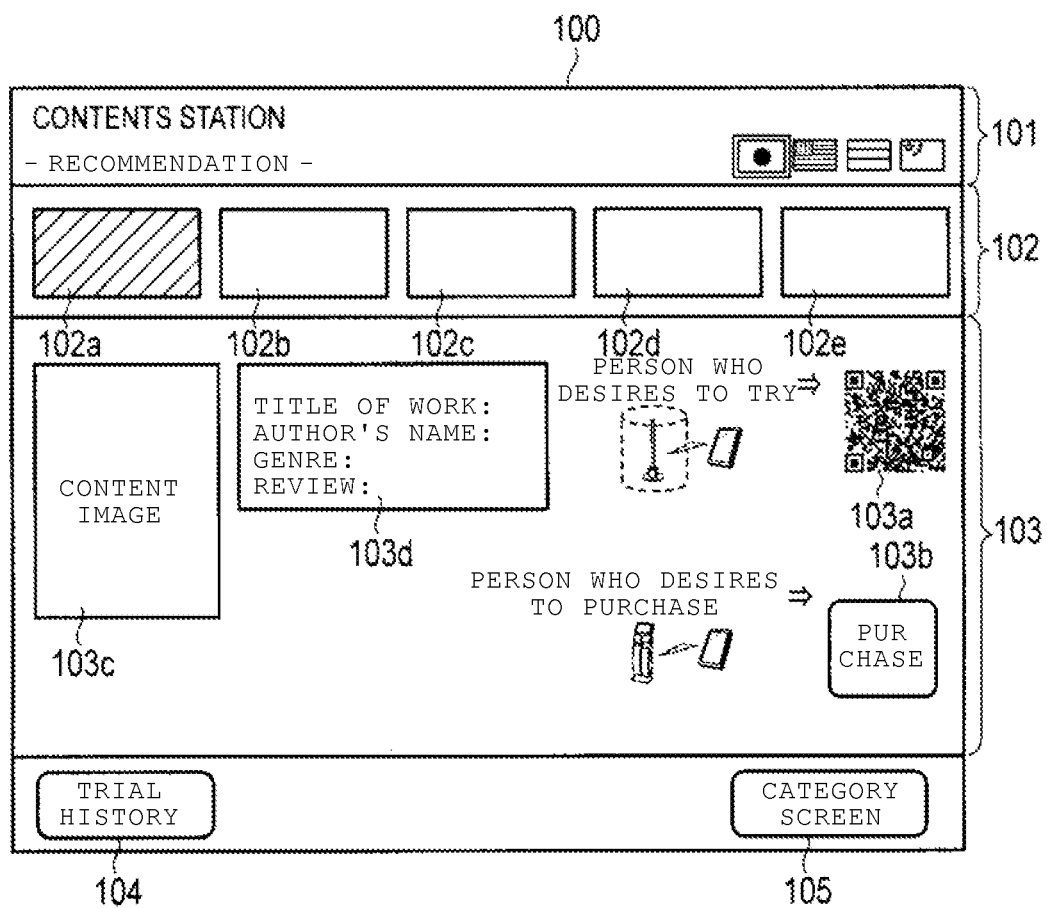
FIG. 10 is a diagram illustrating a display example of a top screen displayed by the kiosk terminal according to this embodiment.

FIG. 10 illustrates a display example of a top (first) screen 100.

The top screen 100 is a main operation screen which is an initial screen of an operation seen by a user. In addition, in a state where an operation through the operation unit 22 is not performed, the display unit 21 of the kiosk terminal 10 displays the top screen 100 as a standby screen. In the example illustrated in FIG. 10, the top screen 100 includes a guide 101, a recommendation list 102, a content screen (downloading selection screen) 103, a trial history button 104, and a category screen button 105.

The recommendation list 102 displays a plurality of content items side-by-side which are recommended to a user by the kiosk terminal 10. The control unit 20 selects content to be displayed in the recommendation list 102 according to an initial setting. For example, the control unit 20 displays, as recommended content, content selected in order of sales volume ranking, content selected by trend analysis, or content recommended using a recommendation engine, and the like in the recommendation list 102.

In addition, the display unit 21 displays recommended content as content icons 102a to 102e that are selectable by a user, in the recommendation list 102. The control unit 20 receives the selection of contents through the content icons 102a to 102e displayed in the recommendation list 102. For example, when the content icon 102a is touched, the control unit 20 causes information on the content of the content icon 102a to be displayed in the content screen (downloading selection screen) on the display unit 21.

The content screen (downloading selection screen) 103 in the top screen 100 displays information on one content item (for example, most recommended content or content selected in the recommendation list 102). In the display example illustrated in FIG. 10, the content screen 103 includes code information 103a, a purchase button 103b, a content image 103c, and content information 103d.

The code information 103a is information such as a readable bar code that may be decoded by the portable terminal T. The code information 103a is an image in which information (information for access to trial content) for viewing and downloading the trial content is coded. For example, the code information 103a is a two-dimensional code. The control unit 20 codes information for trial content to generate the code information 103a as image information that may be read in the camera 44 of the portable terminal T. The control unit 20 displays the generated code information 103a in the content screen (downloading selection screen).

The purchase button 103b is an icon for purchasing (download) the content. When a touch (on the screen) on the purchase button 103b is detected, the control unit 20 starts to download selected content to the portable terminal T using the second communication I/F 26. The content image 103c is image information for introducing details of the content. The information 103*d* is information for providing selected details of the content using information (characters, signs, etc.) other than an image.

In addition, the trial history button 104 is a button for instructing the kiosk to display the trial history screen. When a touch on the trial history button 104 is detected, the control unit 20 causes the trial history screen to be displayed on the display unit 21. The category screen button 105 is a button for instructing to display the category screen. When a touch on the category screen button 105 is detected, the control unit 20 causes the category selection screen to be displayed on the display unit 21.

Figure 11:
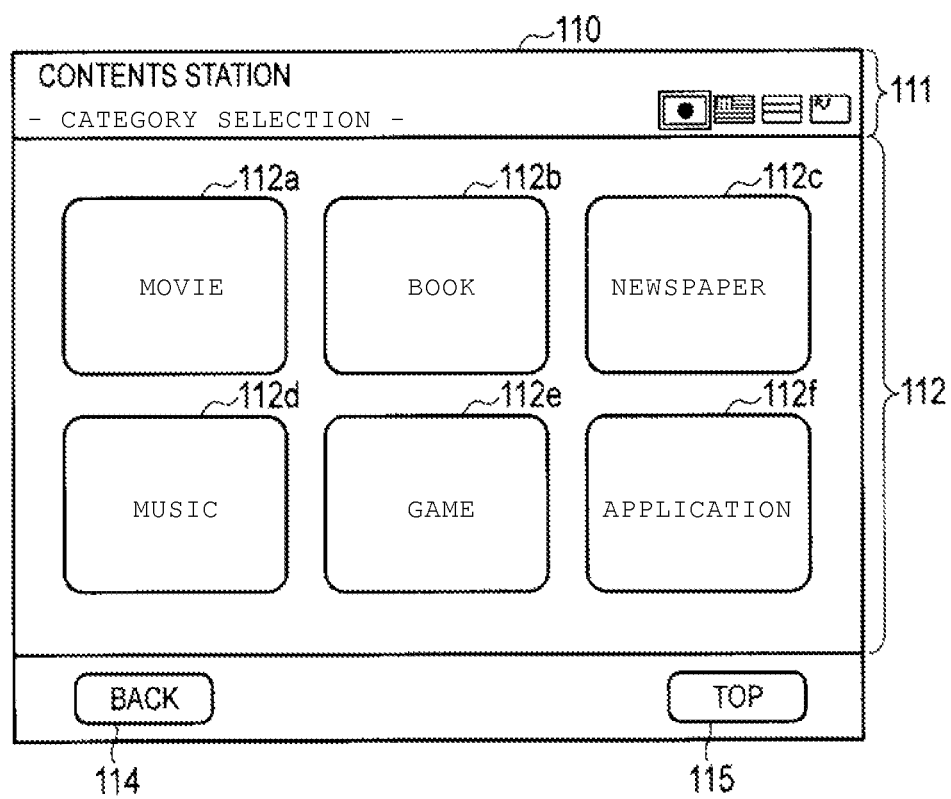
FIG. 11 is a diagram illustrating a display example of a category selection screen displayed by the kiosk terminal according to this embodiment.

FIG. 11 illustrates a display example of a category selection screen 110.

The category selection screen 110 is an operation screen for causing a user to select a content category. For example, when a touch on the screen at the category screen button 105 is detected in the top screen 100, the control unit 20 causes the category selection screen 110 as illustrated in FIG. 11 to be displayed on the display unit 21. The category selection screen 110 illustrated in FIG. 11 includes a guide 111, a category list 112, a back button 114, and a top button 115.

In the category list 112 illustrated in FIG. 11, the display unit 21 displays a list of a plurality of content categories as icons (category icons) 112*a* to 112*f* that are selectable using a touch panel. A user selects the icon displaying a category of a content desired to be displayed, from the category icons 112*a* to 112*f* displayed as a list. When a touch on any one of the category icons 112*a* to 112*f* is detected, the control unit 20 displays the content selection screen 120 for selecting specific content from the selected category. In addition, in the category selection screen 110, a back button 114 and a top button 115 function to instruct the kiosk to return to the top screen 100.

Figure 12:
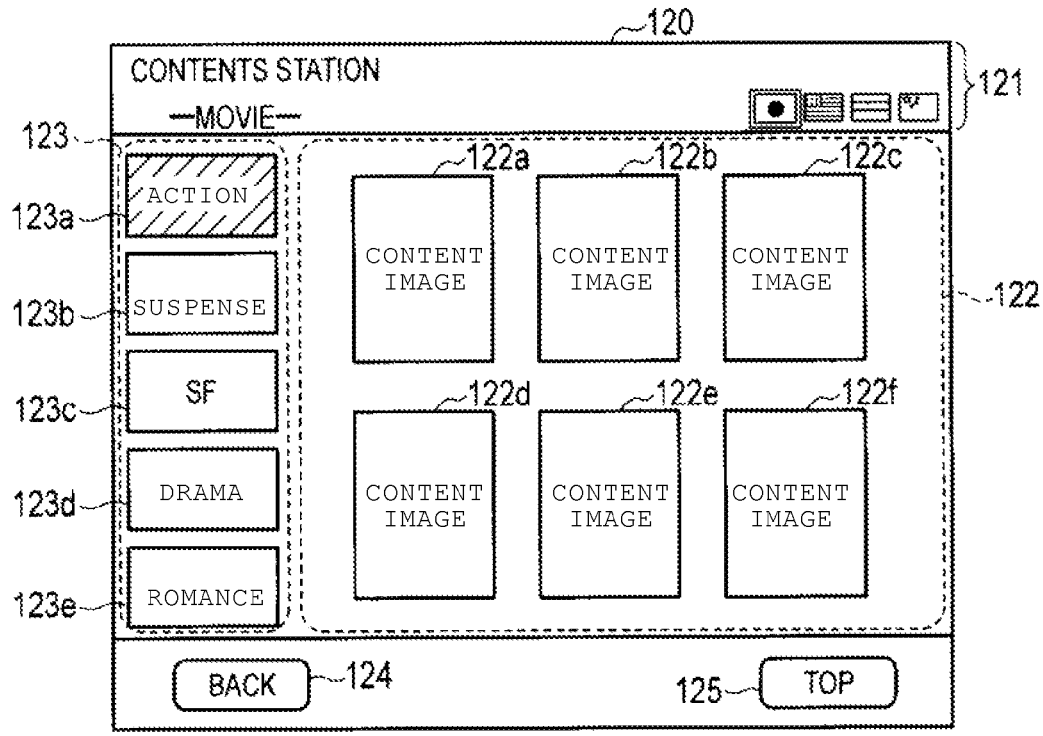
FIG. 12 is a diagram illustrating a display example of a content selection screen displayed by the kiosk terminal according to this embodiment.

FIG. 12 illustrates a display example of the content selection screen 120 display.

The content selection screen 120 is an operation screen for enabling a user to select a specific content. The display example illustrated in FIG. 12 shows the content selection screen 120 when "MOVIE" has been selected as a category. For example, when the "MOVIE" icon 112*a* is selected in the category selection screen 110, the control unit 20 causes the content selection screen 120 as illustrated in FIG. 12 to be displayed on the display unit 21. In the display example illustrated in FIG. 12, the content selection screen 120 includes a guide 121, a content list 122, a genre list 123, a back button 124, and a top button 125.

The display unit 21 displays icons (content icons) 122*a* to 122*f* displaying an image indicating a content, in the content list 122. The control unit 20 causes the content icons 122*a* to 122*f*, selected from all content but narrowed down according to the currently selected setting conditions (for example, categories and genres) to be displayed in the content list 122. For example, FIG. 12 illustrates an example in which the content icons 122*a* to 122*f* of contents having a category of "MOVIE" are displayed in the content list 122.

In the content list 122, the control unit 20 receives the selection of one content icon at a time from a user touching the screen corresponding to a content icon location. When one content icon is selected (touched), the control unit 20 assumes that a content corresponding to the selected icon is selected by a user. When the content is selected, the control unit 20 causes the downloading selection screen 130 of the selected content to be displayed on the display unit 21.

In addition, in the content selection screen 120, the display unit 21 displays icons (genre icons) 123*a* to 123*e* displaying information (characters) indicating a genre, in the genre list 123. In the display example illustrated in FIG. 12, the display unit 21 displays the genre list 123 in a left frame of the content selection screen 120. In the genre list 123, the control unit 20 receives the selection of the genre icons 123*a* to 123*e*. When the genre icon is selected (touched), the control unit 20 narrows down the content (i.e., the content icons) to be displayed in the content list 122, to the selected genre.

In addition, the back button 124 is provided to enable the user to instruct the kiosk to return to the last operation screen from a display screen of the display unit 21. Touching the back button 124 in the content selection screen illustrated in FIG. 12 instructs the kiosk to return to the category selection screen 110 as the last operation screen. In addition, touching the top button 125 instructs the kiosk to return to the top screen 100.

Figure 13:
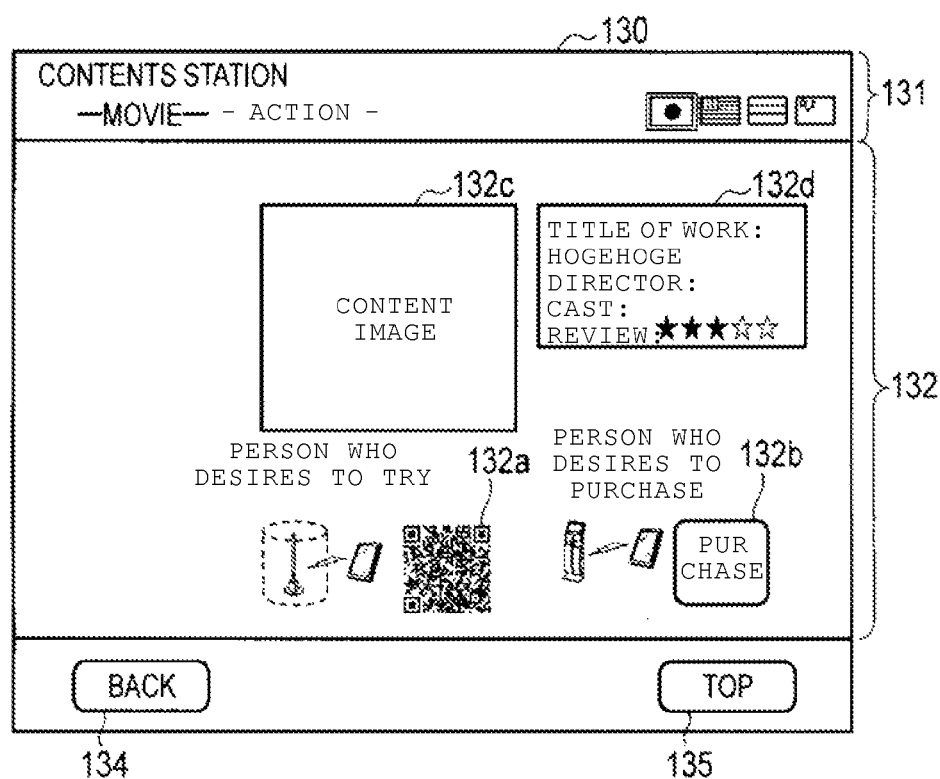
FIG. 13 is a diagram illustrating a display example of a downloading selection screen displayed by the kiosk terminal according to this embodiment.

FIG. 13 illustrates a display example of the downloading selection screen 130.

The display unit 21 displays the downloading selection screen 130 when an item of content is selected. The downloading selection screen 130 displays information concerning one item of content. In the display example illustrated in FIG. 13, the downloading selection screen 130 includes a guide 131, a content screen 132, a back button 134, and a top button 135. In addition, the content screen 132 includes code information 132*a*, a purchase button 132*b*, a content image 132*c*, and content information 132*d*.

The code information 132*a* is image information (for example, two-dimensional code such as a bar code) in which information (information for access to trial content) for trial viewing of the content is coded. The purchase button 132*b* is an icon for allowing a user to purchase (download) the content to a portable terminal. The content image 132*c* is image information for providing details of the content. The content information 103*d* is information for introducing the details of the content using information (characters, signs, etc.) other than an image.

In addition, the back button 134 is a button for instructing the kiosk to return to the last operation screen. The back button 134 in the downloading selection screen 130 illustrated in FIG. 13 is a button for instructing to return to the content selection screen 120 as the last operation screen. In addition, the top button 135 is a button for instructing the kiosk to return to the top screen 100.

Figure 14:
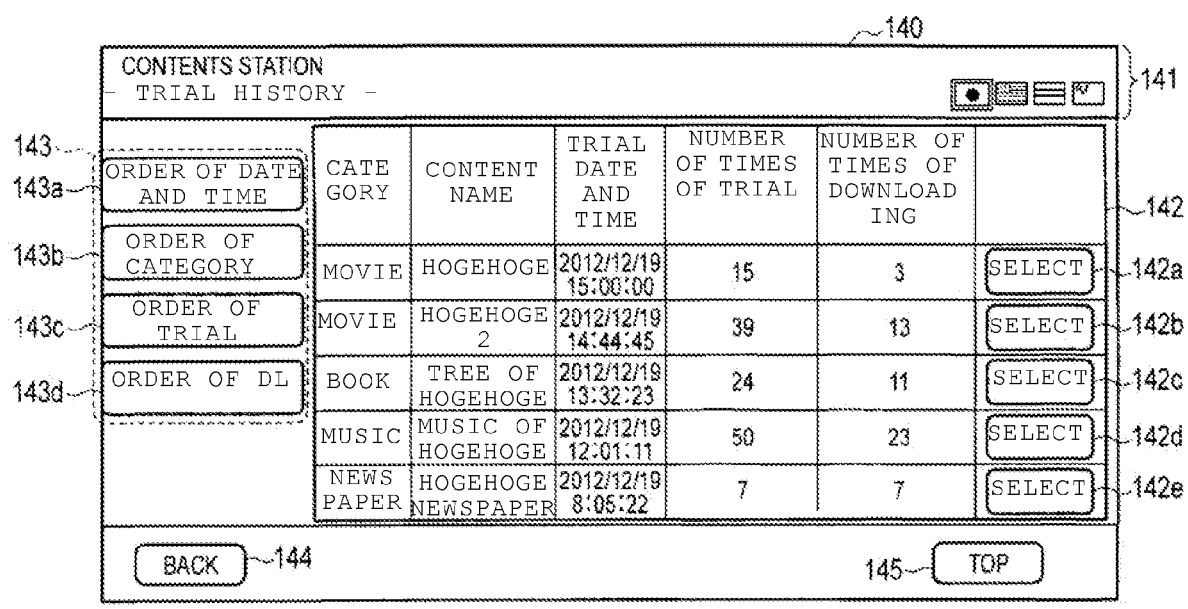
FIG. 14 is a diagram illustrating a display example of a trial history screen displayed by the kiosk terminal according to this embodiment.

FIG. 14 illustrates a display example of a trial history screen 140.

The trial history screen 140 is an operation screen that displays content selected to be displayed on the basis of the trial history of content in a selectable state. For example, when the trial history button 104 is selected in the top screen 100 illustrated in FIG. 10, the control unit 20 causes the trial history screen as illustrated in FIG. 14 to be displayed on the display unit 21. In the display example illustrated in FIG. 14, the trial history screen 140 includes a guide 141, a content list 142, a sorting list 143, a back button 144, and a top button 145.

In addition, the back button 144 is a button to instruct the kiosk to return to the last operation screen. When a transition from the top screen 100 to the trial history screen 140 occurs, the back button 144 is used to instruct the kiosk to return to the top screen 100 as the last operation screen. In addition, the top button 145 is used to return to the top screen 100.

In the display example illustrated in FIG. 14, the content list 142 displays contents selected using trial history information in tabular form. For example, the control unit 20 sorts the contents with the current sorting conditions with respect to the trial history. The control unit 20 creates the content list 142 in which the sorted contents are arranged in an order based on the most recent trial of that content. The control unit 20 causes the created content list 142 to be displayed on the display unit 21. The content list 142 illustrated in FIG. 14 is a tabular list in which pieces of information of various items are stored with respect to the respective contents arranged in order of the most recent trial of the content.

In the example illustrated in FIG. 14, the content list 142 is a table in which categories, content names, trial dates and times (dates and times when last trial is performed), the number of times of trial, the number of times of downloading, and selection icons 142a to 142e are displayed with respect to the respective contents. Meanwhile, the content list 142 is not limited to a tabular form, and may be a list in which, for example, icons (content icons) displaying an image indicating a content are displayed side-by-side.

The selection icons 142a to 142e of the respective contents in the content list 142 are buttons for selecting the contents. In the content list 142, the control unit 20 receives the input to the selection icons 142a to 142e. When one selection icon is selected (touched), the control unit 20 assumes that a content corresponding to the selected selection icon is selected by a user. When the content is selected, the control unit 20 causes the downloading selection screen 130 of the selected content to be displayed on the display unit 21.

In addition, the trial history screen 140 includes the sorting list 143 that displays icons (sorting icons) 143a to 143d displaying pieces of information (characters) indicating sorting conditions. The sorting icons 143a to 143d are buttons for designating the sorting conditions for selecting a content to be displayed in the content list 142. In addition, the sorting conditions designated by the sorting icons 143a to 143d are sorting conditions with respect to the trial history of the content, and thus content may be sorted and displayed by category, trial order or download frequency order, in addition to last trial date and time.

In the sorting list 143, the control unit 20 receives the user selection of a sorting icons 143a to 143d. When the sorting icon is selected (touched), the control unit 20 sorts the contents (content icons) with the selected sorting condition and displays the contents in the content list 142 in the sorted order.

For example, the sorting icon 143a illustrated in FIG. 14 is a button for instructing to sort contents in order of the trial date and time with respect to the trial history. The sorting icon 143b illustrated in FIG. 14 is a button for selecting contents sorted in order of categories with respect to the trial history. The sorting icon 143c illustrated in FIG. 14 is a button for selecting contents sorted in order of the number of times of trial with respect to the trial history. The sorting icon 143d illustrated in FIG. 14 is a button for selecting content sorted in order of the number of times of downloading with respect to the trial history.

In addition, in the sorting list 143, a plurality of sorting icons may be selected. When a plurality of sorting icons are selected, the control unit 20 sorts contents by a combination of the plurality of selected sorting conditions. For example, when the sorting icon 143a and the sorting icon 143b are selected, the control unit 20 sorts the contents by a combination of the order of categories and the order of trial date and time.

In addition, when the sorting is performed in order of the trial date and time (in the example illustrated in FIG. 14, when the sorting icon 143a is selected), the control unit 20 may not only sort the contents in order of the trial date and time, but also restrict contents to be displayed based on a designated period (for example, one day, one week, or one month).

In addition, a user who is undertaking a trial of content does not refer to a trial history during the trial. For this reason, the control unit 20 may not reflect the trial history for the trial content in details displayed in the trial history screen during the trial time by the user. For example, when the trial time is set to 10 minutes, the control unit 20 does not reflect the trial history for the trial content in the details displayed in the trial history screen until 10 minutes elapse from the distribution of the trial content.

However, it is also assumed that the trial history screen reflecting the trial history by a plurality of users refers to trial histories of others. For this reason, the control unit 20 may reflect the trial history for the trial content in the details displayed in the trial history screen immediately after the distribution of the trial content.

As described above, according to the trial history screen, a user selecting specific content with reference to a trial history of the content may search for the content with a small number of operation procedures. For example, a user having trial viewed specific content may detect a desired content with a small number of operation procedures, on the basis of the date and time when the user performs the trial. In addition, even though a user does not actually trial view specific content, the user may search for specific content with reference to trial situations of respective users in the trial history screen.

Furthermore, according to the trial history screen as illustrated in FIG. 14, a user may designate sorting conditions with respect to the trial history, and may cause contents to be displayed in the sorted order under the desired sorting condition.

As described above, the kiosk terminal may sort contents using trial history information in the trial history screen, and thus the viewed trial content may be easily selected. As a result, the kiosk terminal may promote the purchase of the trial viewed content. In addition, the kiosk terminal may increase opportunities to try content other than viewed trial contents, by the sorting of the contents using the trial history information in the trial history screen.

Next, the processing flow of the kiosk terminal 10 will be described.

Figure 15:
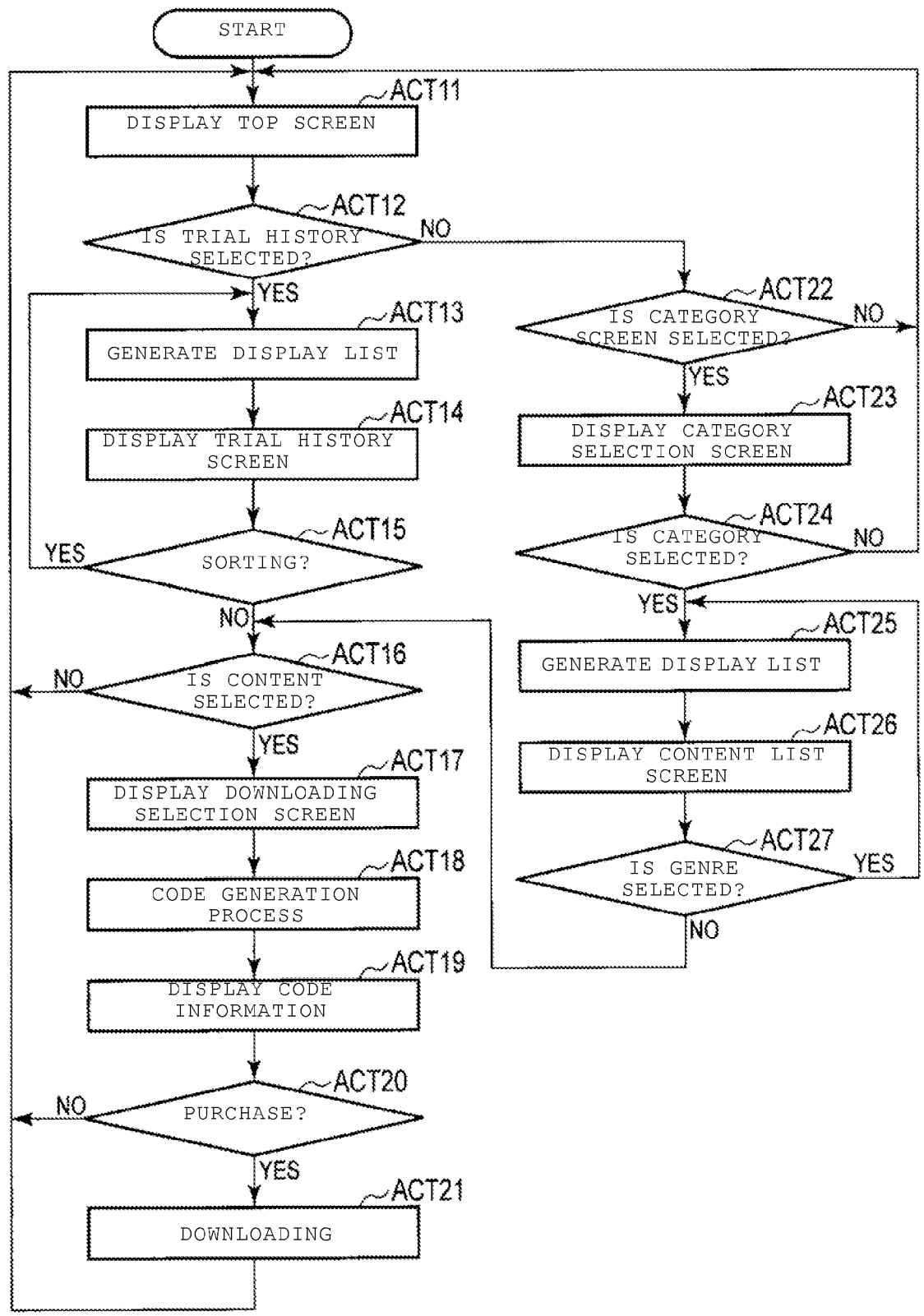
FIG. 15 is a flow chart illustrating a processing flow in the kiosk terminal according to this embodiment.

FIG. 15 is a flow chart for schematically illustrating a process in the kiosk terminal 10.

The control unit 20 of the kiosk terminal 10 controls UIs (user interfaces) (the display unit 21 and the operation unit 22) by the processor executing the UI module 52 of the kiosk application 50. Therefore, in a state where a user's operation is received, the control unit 20 of the kiosk terminal 10 controls the UIs by the processor executing the UI module 52 of the kiosk application 50.

For example, in a standby state, the control unit 20 of the kiosk terminal 10 displays the top screen (TOP) 100 as a standby screen (main operation screen) on the display unit 21 (ACT11). When specific content is selected from the recommendation list 102 of the top screen 100 illustrated in FIG. 10, the control unit 20 proceeds to ACT17. In addition, when the downloading selection screen (content screen) 103 of recommended content is displayed in the top screen 100, the control unit 20 performs processes of ACT17 to ACT19. In addition, when downloading of specific content is selected in the downloading selection screen 103 of the top screen 100, the control unit 20 performs a process of ACT21.

When a touch on the trial history button 104 is detected in the top screen 100, in other words, when a display of the trial history screen is selected (ACT12, YES), the control unit 20 generates a display list of contents to be displayed in the content list 142 of the trial history screen 140 with reference to the history DB 34 and the history table 31a (ACT13). The control unit 20 generates a display list in which contents (trial contents) are sorted in accordance with a sorting condition for the trial history. The sorting condition for the trial history is determined in accordance with a user's operation. Examples of the sorting condition for the trial history include the order of date and time, the order of categories, the order of trial, the order of downloading, and the like which are described with reference to FIG. 14. In addition, when an instruction for the sorting condition is not given by a user, the control unit 20 generates a display list in which contents are sorted in accordance with the sorting condition set as an initial setting.

When a display list for the trial history screen is generated, the control unit 20 displays, on the display unit 21, the trial history screen 140 having the content list 142 in which contents are displayed in the order in the display list (ACT14). In a state where the trial history screen 140 is displayed, the control unit 20 receives an instruction to sort contents based on the selection of the sorting icons 143a to 143d (ACT15). When anyone sorting icon is selected (ACT15, YES), the control unit 20 returns to ACT13 described above to generate a display list and update the content list in the trial history screen.

Meanwhile, when the back button 144 is selected in the trial history screen 140, the control unit 20 returns the operation screen displayed on the display unit 21 to the previously displayed operation screen, and when the top button 145 is selected, the control unit returns the operation screen displayed on the display unit 21 to the top screen 100. In addition, when a non-operation state continues for more than a predetermined time, the operation screen may internally cause a return to the display of the top screen 100.

In addition, when specific content is selected (ACT16, YES), the control unit 20 displays the downloading selection screen 130 displaying information on the selected content (ACT17). Here, ACT17 is also a part of the display unit. The control unit 20 performs a code generation process of generating code information for access to trial content, with respect to the selected content (ACT18). The code information for access to the trial content is code information such as a two-dimensional bar code that may be decoded in the portable terminal T. The code generation process is a process of generating code information, by the control unit 20, in which the information for access to the trial content is coded as a 2 dimensional readable code, such as a bar code. The code generation process will be described later in detail.

When the code information is generated by the code generation process, the control unit 20 displays the generated code information 132a on the downloading selection screen 130 (ACT19). Based on the processes of ACT17 to ACT19, the control unit 20 displays the purchase button 132b for instructing to download (purchase) specific content and the code information 132a for access to the trial content in the downloading selection screen 130. For example, the portable terminal T of a user may read the code information 132 displayed on the downloading selection screen 130 using a camera or other device on the portable terminal T to access to the trial content of the selected content. The reproduction of the trial content using the portable terminal T will be described later in detail.

When a touch on the purchase button 132b displayed on the downloading selection screen 130 is detected, in other words, when the downloading (purchase) of user selected content is selected (ACT20, YES), the control unit 20 performs downloading of the currently displayed content (ACT21). The downloading of the content is a process of transmitting the content to the portable terminal T using the second communication I/F 26. The downloading of the content will be described later in detail.

In addition, when a touch on the category screen button 105 is detected in the top screen 100, in other words, when a display of the category selection screen is selected (ACT22, YES), the control unit 20 displays the category selection screen 110 on the display unit 21 (ACT23). The category selection screen 110 is, for example, an operation screen for selecting a category of a content to be displayed, as illustrated in FIG. 11.

In a state where the category selection screen 110 is displayed, the control unit 20 receives the selection of the category by the selection of the category icons 112a to 112f (ACT24). When a touch on any one category icon is detected, in other words, when the category is selected (ACT24, YES), the control unit 20 generates a display list of contents narrowed down by the search condition including the selected category, as a display list for a content selection screen (ACT25). In addition, when both the category and a genre are selected as the search conditions, the control unit 20 generates a display list of contents narrowed down by the search conditions of the category and the genre.

When the display list for the content selection screen is generated, the control unit 20 displays, on the display unit 21, the content selection screen 120 including the content list 122 displaying contents in the order in the display list (ACT26). The content selection screen 120 is, for example, an operation screen displaying a list of user selectable content, as illustrated in FIG. 12. When a touch on the content icons 122a to 122f is detected in such a content selection screen, in other words, when one content is selected, the control unit 20 proceeds to ACT17.

In addition, the content selection screen 120 illustrated in FIG. 12 includes the genre list 123 in which a genre of content to be displayed is selected. When any one of the genre icons 123a to 123e is selected in the genre list 123 of the content selection screen 120 (ACT27, YES), the control unit 20 returns to ACT25 to create a display list based on the selected genre.

Meanwhile, when the back button 124 is selected in the content selection screen 120 illustrated in FIG. 12, the control unit 20 returns the operation screen displayed on the display unit 21 to the category selection screen 110. In addition, when the top button 125 is selected, the control unit 20 returns the operation screen displayed on the display unit 21 to the top screen 100. In addition, when a non-operation state continues for more than a predetermined time, the control unit 20 may also return the operation screen displayed on the display unit 21 to the top screen.

Next, a generation process of code information (code generation process) in the kiosk terminal 10 will be described.

Figure 16:
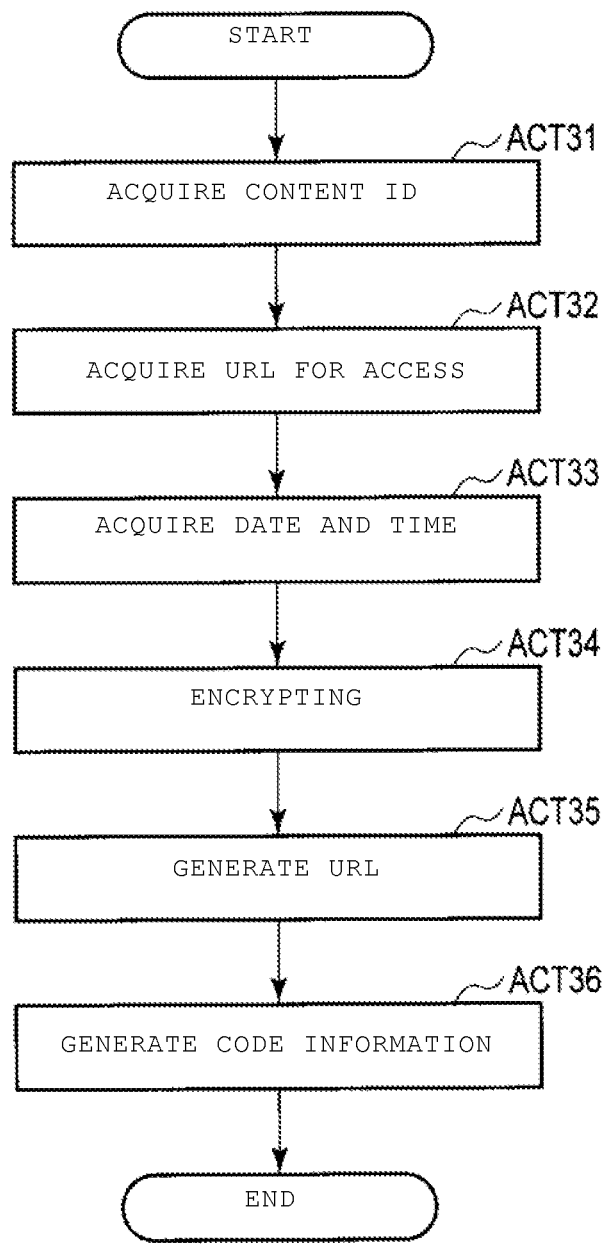
FIG. 16 is a flow chart illustrating a flow of a code generation process in the kiosk terminal according to this embodiment.

FIG. 16 is a flow chart illustrating the code generation process in the kiosk terminal 10.

When content is displayed on the screen of the kiosk terminal 10, the control unit 20 of the kiosk terminal 10 displays, on the display unit 21, code information for access to the trial content of the specific content. The control unit 20 generates the code information for access to the trial content, by the code generation process, every time the content is displayed on the display unit 21. The code generation process is performed by a processor executing the trial module 54 of the kiosk application 50 in the control unit 20 of the kiosk terminal 10.

In the code generation process, the control unit 20 acquires a content ID of the content to be displayed (content to be viewed by a user in a trial of the content) (ACT31). In addition, the control unit 20 acquires a predetermined access URL for access to the trial content of the content to be displayed (ACT32). Furthermore, the control unit 20 acquires information on the current date and time which is timed by the clock 23 (ACT33).

The control unit 20 encrypts one piece of information including three pieces of information of the content ID, the access URL, and the information on the current date and time (ACT34). Meanwhile, a method of encrypting information is not limited to a specific encrypting method. When the content ID, the access URL, and the information on the current date and time are encrypted, the control unit 20 generates an URL (trial URL) for browsing the trial content using the encrypted information as parameters (ACT35). When the trial URL is generated, the control unit 20 generates code information by coding the generated trial URL (ACT36).

According to the above-described code generation process, the control unit of the kiosk terminal generates a trial URL using information including the encrypted access URL as a parameter. For this reason, an access URL for direct access to trial content may not be distinguished from the code information in which the trial URL is coded. As a result, the kiosk terminal may provide the trial URL to a user in a state where the access URL for access to the trial content is hidden (encrypted).

In addition, according to the above-described code generation process, the control unit of the kiosk terminal generates a trial content URL using information, which as a parameter includes information in which the creation date and time of the code information is encrypted. Thus, the kiosk terminal may be operated such that an expiration date is set with respect to the trial URL to be provided to the user in the code information. For example, the kiosk terminal may nullify a trial URL of which a predetermined expiration date passes from the creation date and time of the code information, and may perform the control (restriction) to prohibit the reproduction of a trial content based on the trial URL.

Next, distribution of trial content will be described.

First, processes of the portable terminal T where trial content is reproduced will be described.

Figure 17:
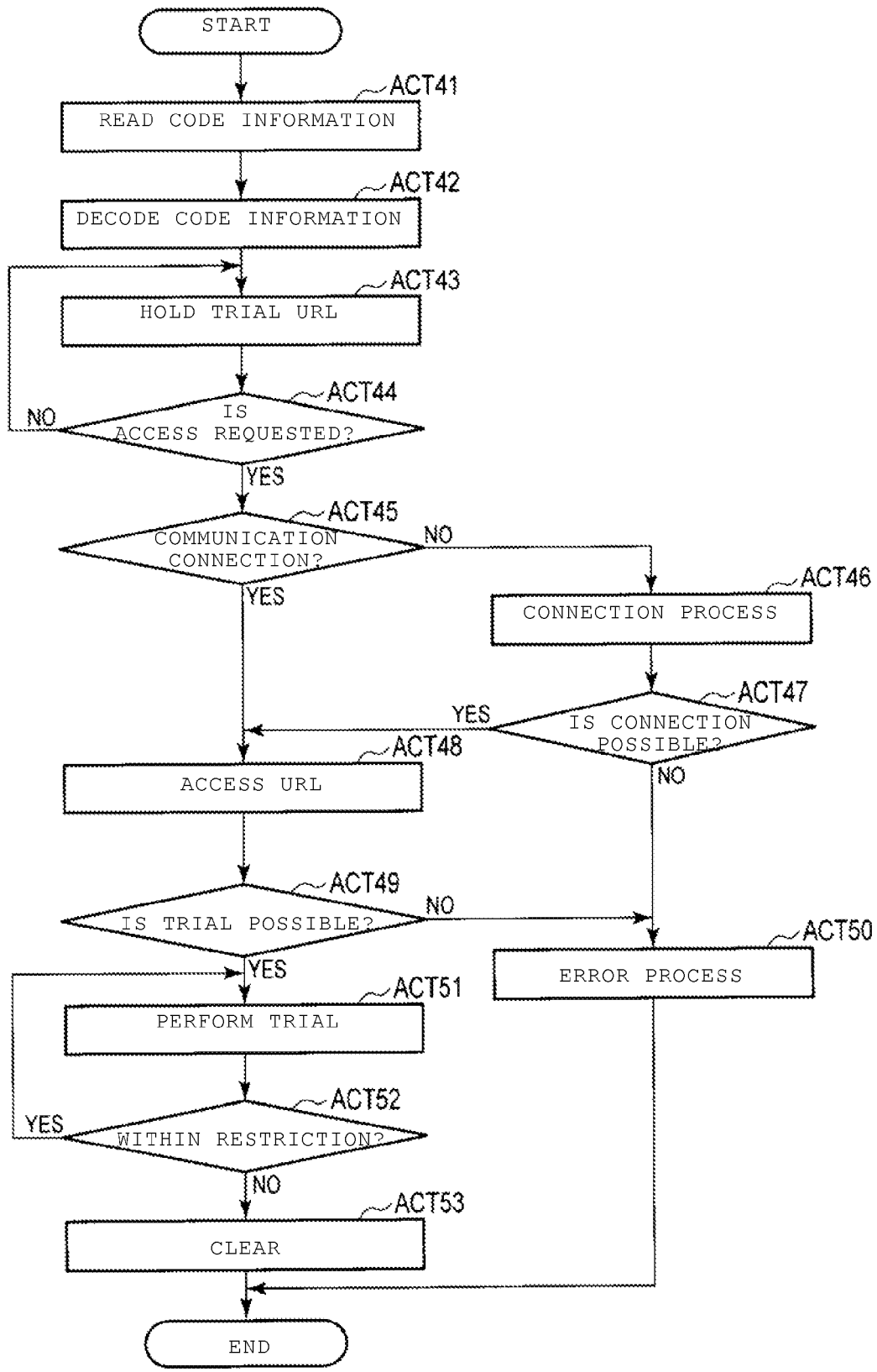
FIG. 17 is a flow chart illustrating a flow of a process of reproducing trial content in the portable terminal according to this embodiment.

FIG. 17 is a flow chart illustrating a flow of a process of reproducing a trial content by the portable terminal T.

As described above, the kiosk terminal 10 displays code information (code information for access to trial content) for trial of a specific content in the content screen 103 of the downloading selection screen 130 or the top screen 100 on the display unit 21. Alternatively, the portable terminal T may read code information displayed on the display unit 21 of the kiosk terminal 10, and reproduce (execute) the specific trial content using a trial URL indicated by the code information.

First, the control unit 40 of the portable terminal T starts up an application program (code reader module) for reading code information in response to a user's operation. When the code reader module is started up, the control unit 20 captures an image including the code information displayed on the display unit 21 of the kiosk terminal 10 by virtue of a user's operation of capturing the image of the code information, using the camera 44 of portable terminal T. The control unit 20 extracts the code information from the image captured by the camera 44 (ACT31). The control unit 20 decodes the code information extracted from the image captured by the camera 44 (ACT32).

The code information includes the trial URL coded therein. Therefore, the information decoded by the control unit 20 includes the trial URL. The control unit 20 holds, in a memory such as a RAM, the trial URL in which the code information is decoded (ACT43). In a state where the trial URL is saved in the memory, the control unit 20 sets an instruction for access to the trial URL (instruction for access to trial content based on trial URL) to be in an input standby state (ACT44).

Meanwhile, in the process example illustrated in FIG. 17, it is assumed that the control unit 20 receives the input of the instruction for access using the operation unit 22, and starts access to the trial content based on the trial URL. However, when the code information is decoded, the control unit 20 may start the access to the trial content based on the trial URL, without first receiving an instruction to access the trial URL using the operation unit 22.

When the instruction for access to the trial URL is input to the operation unit 42 (ACT44, YES), the control unit 20 starts up an application program (access module) for controlling communication with the kiosk terminal 10 using the first communication I/F. When the access module is started up, the control unit 20 checks a communication state with the kiosk terminal 10 using the first communication I/F 45 (ACT45).

When the communication state with the kiosk terminal 10 using the first communication I/F 45 is not established (ACT45, NO), the control unit 40 performs connection with the kiosk terminal 10 using the first communication I/F 45 (ACT46). When the portable terminal T is within the communication range E1, the first communication I/F of the portable terminal T may communicate with the kiosk terminal 10 through the wireless device 11. The connection with the kiosk terminal 10 using the first communication I/F 45 may be performed in response to a user's instruction to connect with the kiosk terminal 10, or may be performed in response to the instruction to access to the trial URL. In addition, when the portable terminal T is in the communication range E1, the portable terminal may be constantly connected with the kiosk terminal 10 using the first communication I/F 45.

When the communication state with the kiosk terminal 10 using the first communication I/F 45 may not be established (ACT47, NO), the control unit 40 of the portable terminal T performs an error process (ACT50). For example, as the error process, the control unit 40 performs notification of an error such as a display, on the display unit 41, of the fact that the communication state with the kiosk terminal 10 using the first communication I/F 45 may not be established.

When the communication state with the kiosk terminal 10 using the first communication I/F 45 is established (ACT45, YES) or when the communication state with the kiosk terminal 10 using the first communication I/F 45 is established by the connection (ACT47, YES), the control unit 20 allows access to the trial URL by wireless communication of the trial URL to the portable terminal T using the first communication I/F 45 (ACT48).

To create or allow access, the control unit 40 transmits the trial URL to the kiosk terminal 10 by the first communication I/F 45. After the transmission of the trial URL, the control unit 40 waits for a notification indicating whether the access to the trial content may be performed. When a notification indicating that the access to the trial content from the kiosk terminal 10 may not be performed is received, the control unit 40 performs an error process (ACT50). For example, as the error process, the control unit 40 displays, on the display unit 41, a guide indicating that the trial content in the trial URL may not be browsed (reproduced).

In addition, when a notification indicating that the permission notification for access to the trial content from the kiosk terminal 10 is received, the control unit 40 starts up an application program (reproduction module) for reproducing the trial content. When the reproduction module is started up, the control unit 40 reproduces the trial content distributed from the kiosk terminal 10 (ACT50). The trial content distributed from the kiosk terminal 10 includes restriction information indicating that the reproduction (execution) may not be performed beyond the communication range E1. For this reason, the control unit 40 reproduces the trial content and restricts the reproduction of the trial content on the basis of the restriction information. For example, the restriction information may be information for setting a cache of the trial content to be in an unavailable state, or may be information for setting a time limit of the cache of the trial content. In addition, for example, the restriction information may be information for checking the communication state with the kiosk terminal 10 at each predetermined period and for setting the trial content to be in a reproducible state when the communication state with the kiosk terminal 10 may be confirmed.

When a state is within a restriction based on the restriction information received together with the trial content (ACT52, YES), the control unit 40 continuously reproduces the trial content distributed from the kiosk terminal 10 (ACT50). In addition, when the state exceeds the restriction based on the restriction information received together with the trial content (ACT52, NO), the control unit 40 stops reproducing the trial content and clears the trial content accumulated in the cache memory (ACT53).

According to the above-described process, the portable terminal may reproduce selected trial content distributed by a kiosk terminal within a communication range of wireless communication using the first communication I/F, and be restricted from reproducing (i.e., viewing) of the trial content beyond the communication range by restriction information received together with the trial content. In addition, the portable terminal may read code information displayed on the display unit of the kiosk terminal, and thus it is possible to acquire the trial URL for requesting reproduction of the trial content and to simplify an operation for reproducing the trial content.

Next, a process of distributing a trial content to the portable terminal T by the kiosk terminal 10 will be described.

Figure 18:
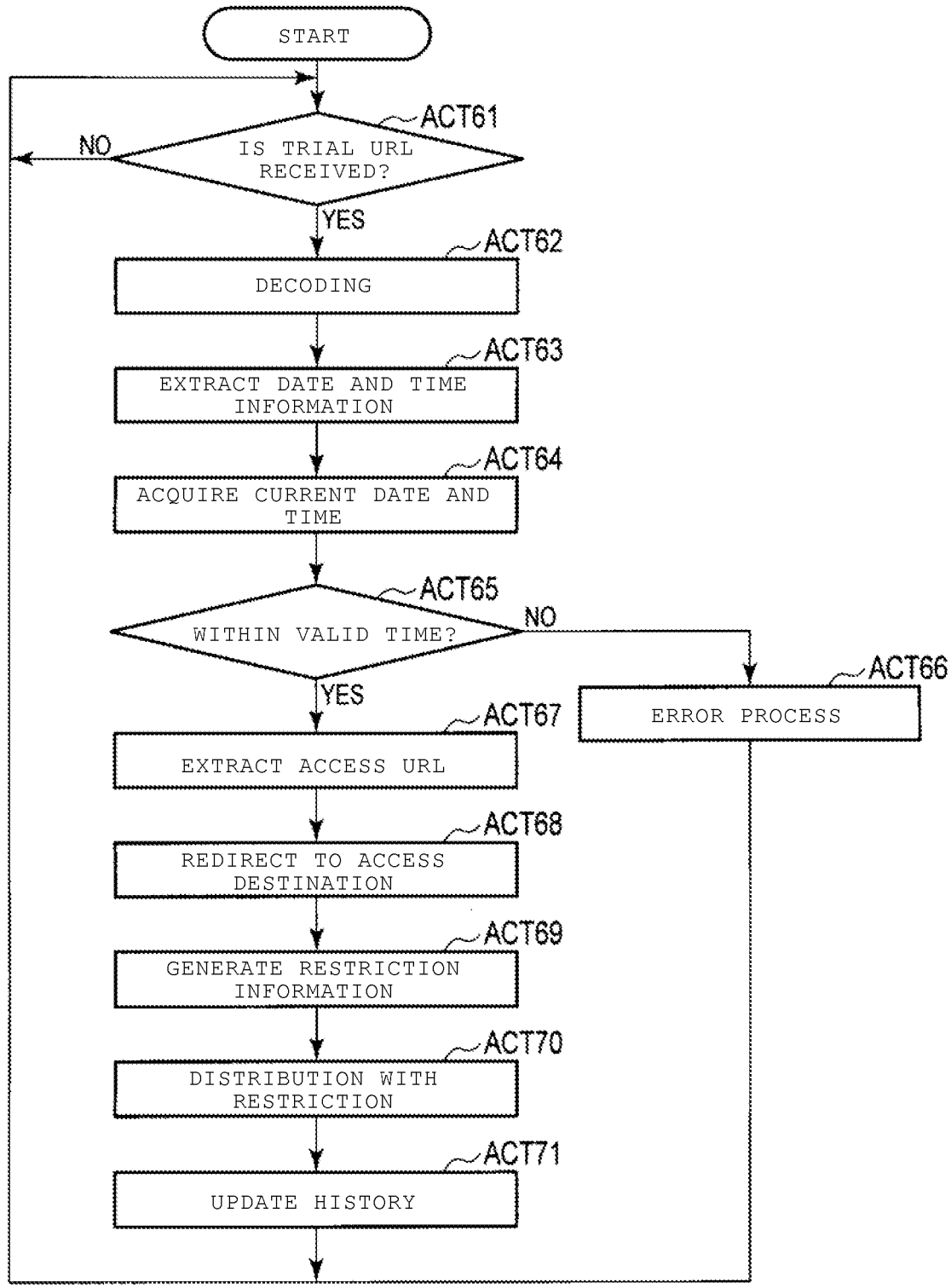
FIG. 18 is a flow chart illustrating a flow of a process of distributing trial content in the kiosk terminal according to this embodiment.

FIG. 18 is a flow chart illustrating a flow of a process of distributing the trial content to the portable terminal T by the kiosk terminal 10.

The control unit 20 of the kiosk terminal 10 receives a trial URL from the portable terminal T in which a communication state is established, through the wireless device 11 using the first communication I/F 25. The control unit 20 determines whether the trial URL is received from the portable terminal T through the wireless device 11 using the first communication I/F 25 (ACT61). Here, ACT61 is performed in the reception unit. When the trial URL is received from the portable terminal T through the wireless device 11 using the first communication I/F 25 (ACT61, YES), the control unit 20 performs the process of distributing the trial content. For example, the control unit 20 performs the process of distributing the trial content, using the trial module 54 of the kiosk application 50.

When the trial module is started up, the control unit 20 decodes the received trial URL (ACT62). The control unit 20 decodes the trial URL by a decoding method corresponding to an encrypting method used in a code generation process. In the code generation process, the control unit 20 uses information, as the trial URL, in which information including a content ID, an access URL, and date and time information is encrypted. Therefore, information in which the trial URL is decoded is information including the content ID, the access URL, and the date and time information.

When the trial URL is decoded, the control unit 20 extracts the date and time information indicating the date and time when the trial URL (code information) is generated from the information in which the trial URL is decoded (ACT63). The control unit 20 acquires the current date and time timed by the clock 23 (ACT64). The control unit 20 determines whether the trial URL received on the basis of the date and time information and the current date and time, which are extracted from the trial URL, is within a valid time (ACT65), i.e., within a time limit for viewing the trial content established by the control unit 20 or other kiosk software program. The valid time is information which is set in advance. For example, the valid time is set with respect to an elapsed time from the time when the code information (trial URL) is created. In this case, the control unit 20 determines whether the trial URL is within the valid time (is valid) according to whether a difference between the current date and time and the date and time which is extracted from the trial URL (date and time when code information is generated) is within a threshold as the valid time.

For example, when the threshold for the valid time for viewing is set to 10 minutes, the control unit 20 determines whether an elapsed time from the date and time when the code information is generated to the present is less than 10 minutes or is equal to or greater than 10 minutes. When the elapsed time from the generation of the code information is less than 10 minutes, the control unit 20 determines that the received trial URL is valid. In addition, when the elapsed time from the generation of the code information is equal to or greater than 10 minutes, the control unit 20 determines that the received trial URL is invalid. Thus, the kiosk terminal 10 may provide the trial URL for reproducing the trial content to a user, as time-limited code information.

When it is determined that the trial URL is not within the valid time (ACT65, NO), the control unit 20 determines that the trial content may not be reproduced in the portable terminal T and performs an error process (ACT66). For example, as the error process, the control unit 20 performs redirection to an URL for an error screen and sets the trial content to be in an irreproducible state. In addition, as the error process, the control unit 20 may notify the portable terminal T, serving as a transmission source of the trial URL, using the first communication I/F 25 that the trial URL is invalid due to running out of the valid time.

When it is determined that the trial URL is within the valid time (ACT65, YES), the control unit 20 performs a process of distributing the trial content to the portable terminal T serving as the transmission source of the trial URL. The control unit 20 extracts an access URL included in the information in which the trial URL was decoded (ACT67). The control unit 20 performs redirection to an access destination of the trial content with reference to the extracted access URL (ACT68).

Furthermore, the control unit 20 generates restriction information on the reproduction of the trial content, using the portable terminal T (ACT69). The control unit 20 distributes the generated restriction information to the portable terminal T using the first communication I/F 25 (ACT70). Here, ACT70 is also a part of the distribution unit. For example, the restriction information is information for prohibiting caching of the trial content in the portable terminal T or restricting the caching of the trial content by time. In addition, the restriction information may be information in which the portable terminal T may restrict the reproduction of the trial content using the portable terminal T to the instance where the portable terminal T is within the communication range E1 using the first communication I/F 25. In addition, as the restriction information, information for restricting the number of times the trial content (for example, once) may be viewed, or information for restricting a viewing time period (for example, within a predetermined time from being sent to the portable terminal T) may be used.

When the trial content is distributed to the portable terminal T using the first communication I/F 25, the control unit 20 updates history information (ACT71). The control unit 20 saves the history information indicating that the trial content was distributed, in the history DB 34, and updates the history table 31*d*. For example, the control unit 20 increments the number of times the trial content of a specific content was viewed in correspondence to a content ID of the content in the history table 31*d*.

According to the above-described process, the kiosk terminal 10 may cause trial content to be reproduced (executed) using the portable terminal T only within a limited range. In addition, the kiosk terminal may 10 restrict the reproduction (execution) of the trial content using the portable terminal to a space such as the communication range of the first communication I/F, may limit viewing to a specific time or range of time such as a reproducible time, or may restrict viewing of the trial content by the number of times it may be viewed such as the number of times of reproduction thereof on the portable terminal. Thus, in the information distribution system including the kiosk terminal, it is possible to attract users reproducing a trial content in a communication range of the kiosk terminal or the first communication I/F.

Next, downloading will be described.

Figure 19:
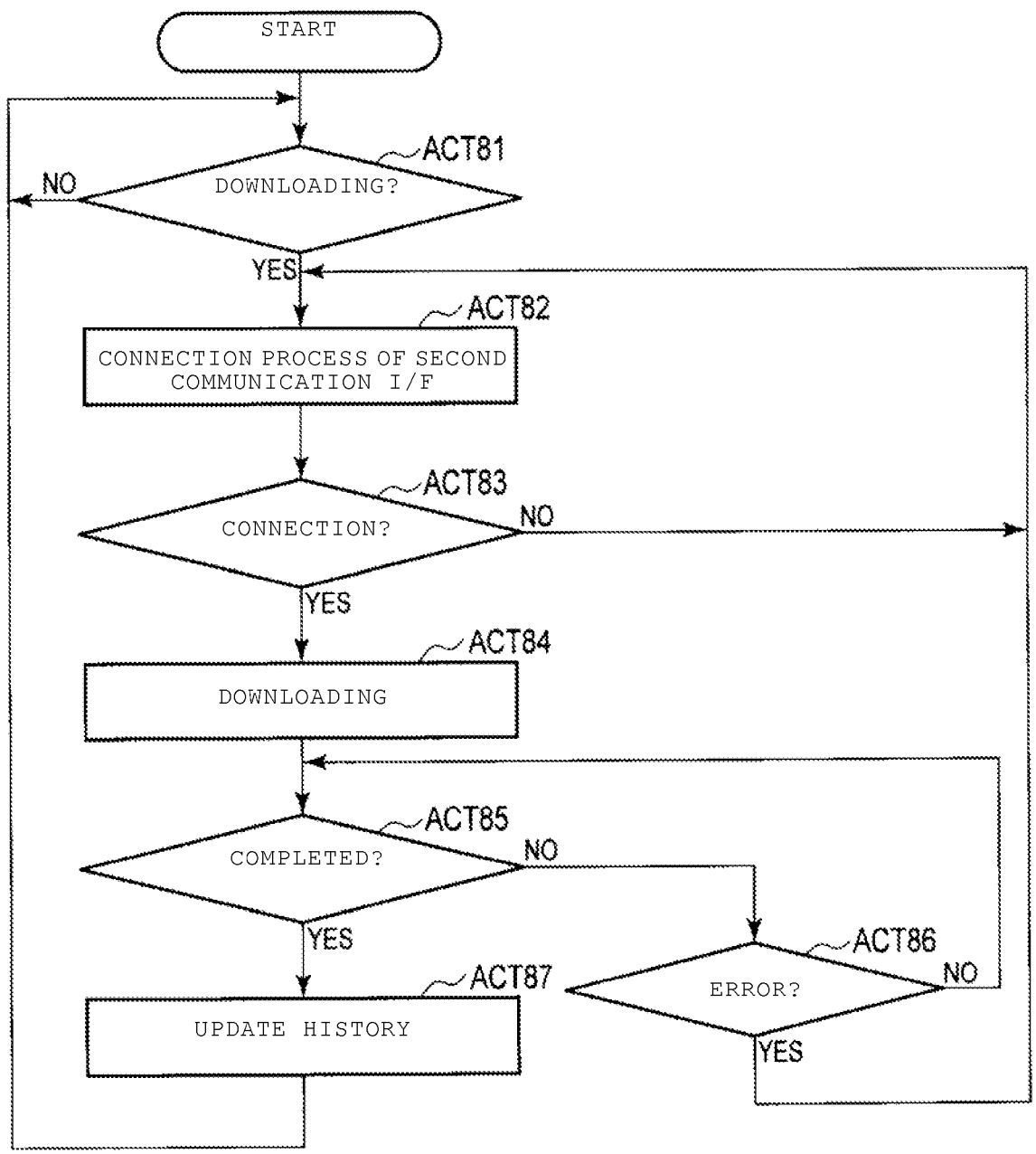
FIG. 19 is a flow chart illustrating a flow of a process of downloading content in the kiosk terminal according to this embodiment.

FIG. 19 is a flow chart illustrating a flow of downloading of a content in the kiosk terminal.

When a touch on a purchase button for instructing to download (purchase) a content displayed on the display unit 21 of the kiosk terminal 10 is detected (ACT81, YES), the control unit 20 specifies a content ID of the content which is requested for purchase (downloaded), by the UI module 52 and the content management module 51 of the kiosk application 50.

When the content ID of the content to be downloaded is specified, the control unit 20 starts up the transmission module 56 of the download application 55. When the transmission module is started up, the control unit 20 starts the downloading of the content corresponding to the specified content ID. First, the control unit 20 connects with the portable terminal T using the second communication I/F 26 (ACT82). The control unit 20 outputs a response requirement using the second communication I/F 26, and receives a response signal from the portable terminal T to establish a communication state with the portable terminal T.

For example, a user brings the portable terminal T close to a portion at which the second communication I/F 26 of the kiosk terminal 10 is installed. Then, the second communication I/F 26 and the portable terminal T mutually transmit and receive a signal, thereby establishing the communication state. According to such connection, it is possible to realize communication connection between the second communication I/F 26 and the portable terminal T even though a user does not operate the operation unit.

When the communication state between the second communication I/F 26 and the portable terminal T is established (ACT83, YES), the control unit 20 transmits (downloads) data (data in content path corresponding to content ID) of the content to the portable terminal T using the second communication I/F 26 (ACT84). In addition, when charging to a user is necessary in association with the downloading of the content, the control unit 20 may perform the charging by the communication with the portable terminal T using the second communication I/F 26.

During the downloading of the content, the control unit 20 determines whether the transmission of the content has completed (ACT85). When the transmission of the content is not completed (ACT85, NO), the control unit 20 determines whether an error occurred during the transmission (ACT86). When an error occurred during the transmission (ACT86, YES), the control unit 20 transitions to ACT82 to re-perform the connection between the second communication I/F 26 of the kiosk terminal and the portable terminal T and again attempt to download the content to the portable terminal 10.

When the transmission of the content is completed without detecting an error during the transmission (ACT85, YES), the control unit 20 updates history information (ACT87). The control unit 20 saves, in the history DB (database) 34, the history information indicating that the content was downloaded, by the content management module of the kiosk application, and updates the history table 31*d*. For example, the control unit 20 increments the number of times the content was downloaded in correspondence with the content ID of the content in the history table 31*d*.

According to the above-described process, the kiosk terminal downloads user selected content to a user's portable terminal T by communication between the second communication I/F performing the transmission of data in a proximate state and the portable terminal T. Thus, the content for which downloading is completed may be reproduced (executed) in the portable terminal in which the downloading was performed.

As described above, the kiosk terminal according to this embodiment changes a method of distributing content when a user desires trial of the content or purchase of the content. The kiosk terminal distributes the trial content to a user desiring a trial of the content, using a communication method capable of performing communication in a predetermined communication range, and reproduces the trial content within a limited physical range from the kiosk terminal 10 or the transmitter 11. In addition, the kiosk terminal distributes the content to a user desiring to purchase the content using a proximity communication method capable of transmitting data to a portable terminal in a proximate state to the kiosk with a simple operation. Thus, the kiosk terminal may distribute a digital content using a plurality of distribution methods according to purposes or uses.

A user may desire to confirm details of the content before purchasing the content. The kiosk terminal distributes a trial content (a part of content or the whole content in which data volume is compressed) using the second communication I/F, with respect to the content the user wants to preview by a trial. The trial content is data that may be restricted to an irreproducible state beyond a communication range of the second communication I/F and that may be reproduced on the basis of information presented in the kiosk terminal within the communication range of the second communication I/F.

For example, an example of an operation form in a bookstore will be described. In the kiosk terminal 10, the inside of the bookstore is set to be in the communication range E1 in which wireless communication using the first communication I/F 25 may be performed. Then, in the inside of the bookstore (within communication range E1), a user may read (by a trial) a trial content such as an electronic book which is distributed through the wireless device 11, on the portable terminal T. Furthermore, when the user having read the content is tempted to purchase the content, the user purchases the content by operating the kiosk terminal installed within the bookstore and brings the user's own portable terminal T close to a position at which the second communication I/F is installed (communication unit). Then, the kiosk terminal downloads the content being purchased by the user to the portable terminal T, using the second communication I/F capable of a high-speed communication in a proximate state.

That is, the kiosk terminal may provide a trial content that may be browsed in a range limited to a communication range, and may transmit (download) a digital content itself having a large data size in a proximate state at a high speed. In addition, the trial content may be limited to distribution and reproduction within a communication range around the kiosk terminal. As a result, the information distribution system may promote content selling using the kiosk terminal, may gather users desiring to reproduce a trial content in the communication range, and may contribute to the attracting of customers in a place where the kiosk terminal is installed or in the communication range E1.

In the embodiments, any of the processes described above can be accomplished by a computer-executable program, and this program can be embodied in a non-transitory computer-readable memory device. In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above. Furthermore, based on an instruction in the installed program, an OS (operating system) of the computer, or MW (middleware software), such as database management software or network, may execute one or more parts of the processes described above to realize the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for distributing electronic content to a portable terminal of a user in physical proximity thereto, comprising:
   a control server;
   a communication device including a receiver and a transmitter capable of communicating with the portable terminal; and
   a memory storing full content and trial content representative of the full content,
   wherein the trial content is transmitted by the communication device to the portable terminal if the communication device confirms that the portable terminal is within a communication range of the transmitter and is not transmitted by the communication device to the portable terminal if the communication device cannot confirm that the portable terminal is within the communication range of the transmitter.

2. The apparatus of claim 1, wherein the trial content is viewable on the portable terminal when the portable terminal is within the communication range.

3. The apparatus of claim 2, wherein transmitter is a wireless transmitter.

4. The apparatus of claim 2, wherein the communication device includes a first communication unit and a second communication unit, and the first and second communication units have different effective communication ranges.

5. The apparatus of claim 4, wherein the communication device is located within a kiosk.

6. The apparatus of claim 5, wherein the communication range of the second communication unit does not extend substantially beyond the kiosk.

7. The apparatus of claim 5, wherein the communication range of the first communication unit extends beyond the kiosk.

8. The apparatus of claim 5, wherein the trial content is transmitted through the first communication unit.

9. The apparatus of claim 5, wherein the full content is transmitted through the second communication unit and is not transmitted through the first communication unit.

10. An information distribution method comprising:
    displaying information of distributable full content;
    receiving a trial request for the distributable full content from a portable terminal; and
    distributing, to the portable terminal over a communication link, a trial content which is viewable within a communication range of the communication link, the trial content being representative of the distributable full content for which the trial request is received.

11. The method of claim 10, wherein
    the distributing of the trial content is realized by wireless communication.

12. The method of claim 10, further comprising:
    receiving an instruction to distribute the full content to the portable terminal; and
    distributing the full content to the portable terminal via a second communication link which is different from the communication link over which the trial content was distributed.

13. The method of claim 12, wherein the trial content is viewable within the communication range of the communication link over which the trial content was distributed.

14. The method of claim 12, wherein the full content is delivered to the portable terminal over a physical connection.

15. The method of claim 10, wherein the trial content is viewable on the portable terminal for a prescribed period of time after receipt thereof and not viewable thereafter.

16. A non-transitory computer readable medium having an information distribution program stored therein for causing a computer to execute a method comprising the steps of:
    displaying information of distributable full content;
    receiving a trial request for the distributable full content from a portable terminal; and
    distributing, to the portable terminal over a communication link, a trial content, which is viewable within a communication range of the communication link, the trial content being representative of the distributable full content for which the trial request is received.

17. The non-transitory computer readable medium of claim 16, wherein
    the distributing is realized by wireless communication.

18. The non-transitory computer readable medium of claim 16, wherein the method further comprises the steps of:
    receiving an instruction to distribute the full content to the portable terminal; and
    distributing the full content to the portable terminal via a second communication link which is different from the communication link over which the trial content was distributed.

19. The method of claim 18, wherein the full content is delivered to the portable terminal over a physical connection.

20. The method of claim 16, wherein the trial content is viewable on the portable terminal for a prescribed period of time after receipt thereof and not viewable thereafter.

* * * * *